(12) United States Patent
Kajino et al.

(10) Patent No.: US 11,273,732 B2
(45) Date of Patent: *Mar. 15, 2022

(54) LIFTER DEVICE

(71) Applicant: TOYOTA BOSHOKU KABUSHIKI KAISHA, Aichi-ken (JP)

(72) Inventors: Yusuke Kajino, Aichi-ken (JP); Yasuaki Suzuki, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/050,317

(22) PCT Filed: Apr. 25, 2019

(86) PCT No.: PCT/JP2019/017819
§ 371 (c)(1),
(2) Date: Oct. 23, 2020

(87) PCT Pub. No.: WO2019/208744
PCT Pub. Date: Oct. 31, 2019

(65) Prior Publication Data
US 2021/0122264 A1 Apr. 29, 2021

(30) Foreign Application Priority Data

Apr. 27, 2018 (JP) .............................. JP2018-086134

(51) Int. Cl.
*B60N 2/16* (2006.01)
*B60N 2/02* (2006.01)

(52) U.S. Cl.
CPC .......... *B60N 2/165* (2013.01); *B60N 2/0244* (2013.01); *B60N 2/167* (2013.01)

(58) Field of Classification Search
CPC ................................ B60N 2/165; B60N 2/167
See application file for complete search history.

(56) References Cited

U.S. PATENT DOCUMENTS

| 5,881,854 A | 3/1999 | Rougnon-Glasson |
| 6,283,886 B1 | 9/2001 | Schumann |
| (Continued) | | |

FOREIGN PATENT DOCUMENTS

| JP | 2002-301956 | 10/2002 |
| JP | 2013-224692 | 10/2013 |
| (Continued) | | |

OTHER PUBLICATIONS

International Search Report issued in International Patent Application No. PCT/JP2019/017819, dated Jun. 18, 2019 (along with Enlglish translation thereof).

(Continued)

*Primary Examiner* — Timothy J Brindley
(74) *Attorney, Agent, or Firm* — Greenblum & Bernstein, P.L.C.

(57) ABSTRACT

Pawls in a lifter device have: outer teeth that are rotatably supported by shafts in lock plates and are meshed with inner teeth of a base; and pins that are provided in an intermediate section in the radial direction, between the shaft center of the shafts and the teeth tips of the inner teeth, and are pressed in the rotation direction by a rotation transmittance plate during a release operation.

4 Claims, 34 Drawing Sheets

(56) References Cited

U.S. PATENT DOCUMENTS

| | | |
|---|---|---|
| 6,666,423 B1 | 12/2003 | Nemoto |
| 8,241,165 B2 | 8/2012 | Nadgouda et al. |
| 8,800,947 B2 | 8/2014 | Suzuki et al. |
| 9,744,883 B2 | 8/2017 | Nakagawa |
| 9,855,870 B2 | 1/2018 | Suzuki |
| 10,112,506 B2 | 10/2018 | Izawa et al. |
| 10,471,856 B2 | 11/2019 | Suzuki et al. |
| 10,562,416 B2 | 2/2020 | Kajino et al. |
| 10,625,633 B2 | 4/2020 | Suzuki |
| 2013/0026806 A1* | 1/2013 | Yamada ............... B60N 2/167 297/311 |
| 2015/0096859 A1* | 4/2015 | Isoda .................... F16D 41/18 192/15 |
| 2017/0088018 A1* | 3/2017 | Suzuki ................. B60N 2/167 |
| 2017/0240069 A1 | 8/2017 | Asai et al. |
| 2020/0171984 A1 | 6/2020 | Kajino et al. |
| 2020/0282873 A1* | 9/2020 | Kajino ................. B60N 2/165 |
| 2020/0284330 A1* | 9/2020 | Kajino ................. F16H 31/002 |
| 2020/0398706 A1 | 12/2020 | Suzuki |
| 2021/0122264 A1 | 4/2021 | Kajino et al. |
| 2021/0129713 A1* | 5/2021 | Kajino ................. B60N 2/1685 |
| 2021/0146805 A1* | 5/2021 | Suzuki ................. B60N 2/167 |

FOREIGN PATENT DOCUMENTS

| | | | |
|---|---|---|---|
| JP | 2016-78850 | 5/2016 | |
| WO | WO-2018216783 A1 * | 11/2018 | ............. F16D 41/18 |

OTHER PUBLICATIONS

Office Action dated Aug. 24, 2021 in the counterpart Japanese patent application No. 2018-086134 (and its English translation).

Office Action dated Aug. 24, 2021 in related Japanese patent application No. 2018-086135 (and its English translation).

Written Opinion issued in International Patent Application No. PCT/JP2019/017819, dated Jun. 18, 2019 (and English translation thereof).

Non-Final Office Action dated Sep. 10, 2021 in cross-cited U.S. Appl. No. 17/050,326.

* cited by examiner

LIFTER DEVICE

TECHNICAL FIELD

The present invention relates to a lifter device. Specifically, the present invention relates to a lifter device including a pinion gear configured to mesh with an input gear of a link mechanism that lifts and lowers a seat and a rotation control device that couples the pinion gear and an operation handle operated in a corresponding rotation direction when the seat is lifted and lowered to control rotation of the pinion gear.

BACKGROUND ART

A vehicle seat that has a configuration including a lifter device capable of adjusting a seat surface height of a seat cushion is disclosed (Patent Literature 1). Specifically, by an operation of lifting or lowering an operation handle, the lifter device transmits a movement amount of the operation as a feed rotation movement amount of a gear to lift or lower the seat surface height by a fixed amount. When the operation of the operation handle is released, the lifter device locks rotation of the gear in its position, and returns the operation handle to a neutral position before the operation by biasing so that the operation handle is returned to an initial state in which the operation can be performed again.

Feed rotation of the gear with the operation of the operation handle is performed by pushing a feed pawl meshed with the same gear in an operation direction of the operation handle. A lock pawl including a pair of symmetrical structures meshed with the same gear has a ratchet meshing structure in which one is disengaged from the gear with the operation of the operation handle and the other allows rotation in a feed direction to escape and meshes with the gear in a case of rotation in a reverse direction. Accordingly, the rotation lock of the gear when the operation of the operation handle is released is performed by stopping the feed rotation and the return rotation of the gear in the position where the operation of the operation handle is released.

CITATION LIST

Patent Literature

Patent Literature 1: JP-A-2016-78850

SUMMARY OF INVENTION

Technical Problem

In the above technology in the related art, the operation of disengaging the lock pawl from the gear by the operation of the operation handle converts a rotational movement of the operation handle into a linear movement in a circumferential direction. Therefore, the movement amount of the operation required for the unlocking is large, and the feed rotation movement amount of the gear is small. An object of the present invention is to shorten a stroke required for an unlocking operation of a lifter device with an operation of an operation handle.

Solution to Problem

[1] According to a first aspect of the present invention, a lifter device includes:

a pinion gear configured to mesh with an input gear of a link mechanism that lifts and lowers a seat;

a rotation control device that couples the pinion gear and an operation handle to control rotation of the pinion gear, the operation handle being operated in a corresponding rotation direction when the seat is lifted and lowered; and a base that supports the pinion gear such that the pinion gear is rotatable, and the rotation control device includes:

an input member coupled to the operation handle and configured to be rotated about a rotation axis of the pinion gear by a rotation operation of the operation handle;

a feed unit coupled to the input member and the pinion gear and configured to transmit rotation of the input member to the pinion gear as feed rotation;

a lock unit configured to stop rotation of the pinion gear feed-rotated by the feed unit relative to the base; and a release member configured to be rotated about the rotation axis of the pinion gear by rotation input from the input member to release the lock unit, the lock unit includes a lock pawl attached to a rotation member integrally coupled to the pinion gear in the rotation direction, the lock pawl being configured to be meshed in a biased state with a base gear of the base that has inner teeth to stop the rotation of the pinion gear, the lock pawl is rotatably supported on a shaft portion of the rotation member about an axis parallel to the rotation axis of the pinion gear, and the lock pawl includes:

outer teeth configured to be meshed with the base gear; and a pressed portion provided at an intermediate position in a radial direction between a shaft center of the shaft portion and a tooth tip of the inner teeth of the base gear, the pressed portion being configured to be pressed in the rotation direction by the release member to be released.

According to the first aspect, when the meshing between the lock pawl and the base gear (that is, the lock of the lifter device) is released, the release member presses the pressed portion provided on the lock pawl in the rotation direction. Accordingly, the lock pawl rotates about the shaft portion and is displaced away from the base gear so that the lock pawl and the base gear are unmeshed. Here, the pressed portion of the lock pawl is provided at a predetermined position (intermediate position) in the radial direction between the shaft center of the shaft portion and the tooth tip of the inner teeth of the base gear. Therefore, the lock pawl can be efficiently displaced in response to a rotational movement amount of the release member compared with a case where the pressed portion of the lock pawl is located at other positions so that the lock pawl and the base gear can be more easily unmeshed. Therefore, the lifter device can shorten a stroke required for an unlocking operation with the operation of the operation handle.

[2] According to a second aspect of the present invention, in the first aspect described above, an angle defined by a first contact surface that is provided on the release member and that comes into contact with the pressed portion of the lock pawl and a second contact surface of an outer surface of the outer teeth of the lock pawl that comes into contact with the inner teeth of the base gear is larger than a friction angle defined by the second contact surface and a tooth surface of the inner teeth of the base gear.

According to the second aspect, when the pressed portion is pressed in the rotation direction by the release member in a state in which the first contact surface of the release member is in contact with the pressed portion of the lock pawl, the angle defined by the first contact surface and the second contact surface is larger than the friction angle described above. Accordingly, a force in a direction in which the lock pawl is separated from the base gear can be sufficiently increased relative to the frictional force generated between the outer teeth (second contact surface) of the lock pawl and the inner teeth of the base gear. Therefore, the outer teeth of the lock pawl can be smoothly disengaged from the inner teeth of the base gear.

[3] According to a third aspect of the present invention, in the first or the second aspect described above, a plurality of the lock pawls include a pair of ratchet meshing structures that function in directions symmetrical with each other, the ratchet meshing structures being configured to function such that, when rotation in one direction is input to the rotation member, the lock pawls mesh with the base gear to transmit power, and when rotation in the other direction is input to the rotation member, the lock pawls are released from meshing with the base gear not to transmit power, and the plurality of the lock pawls each include the pressed portion on an outer circumferential surface of the lock pawl and have the same flat plate shape as each other According to the third aspect, the ratchet meshing structures can be constituted by the plurality of lock pawls having the same flat plate shape. Particularly, when the pressed portion are provided on the outer circumferential surface of the lock pawls (see FIG. 30), the number of types of lock pawls required for the meshing structures can be reduced as compared with, for example, a case where the pressed portion is provided as the protrusion protruding in a thrust direction from the lock pawls (see FIG. 9). Therefore, it is possible to prevent erroneous assembly of the lock pawls and to reduce the number of management components.

[4] According to a fourth aspect of the present invention, in any one of the first to the third aspects described above, an angle defined by a normal line of a second contact surface of an outer surface of the outer teeth of the lock pawl that comes into contact with the inner teeth of the base gear and a line obtained by connecting a contact point between the second contact surface and a tooth surface of the inner teeth and the shaft center of the shaft portion is smaller than a friction angle defined by the second contact surface and the tooth surface of the inner teeth.

According to the fourth aspect, as in the second aspect, a force in a direction in which the lock pawl is separated from the base gear can be sufficiently increased relative to the frictional force generated between the outer teeth (second contact surface) of the lock pawl and the inner teeth of the base gear. Therefore, the outer teeth of the lock pawl can be smoothly disengaged from the inner teeth of the base gear.

DESCRIPTION OF EMBODIMENTS

Hereinafter, an embodiment for carrying out the present invention will be described with reference to the drawings.

First Embodiment

<Schematic Configuration of Lifter Device 10>

Figure 1:
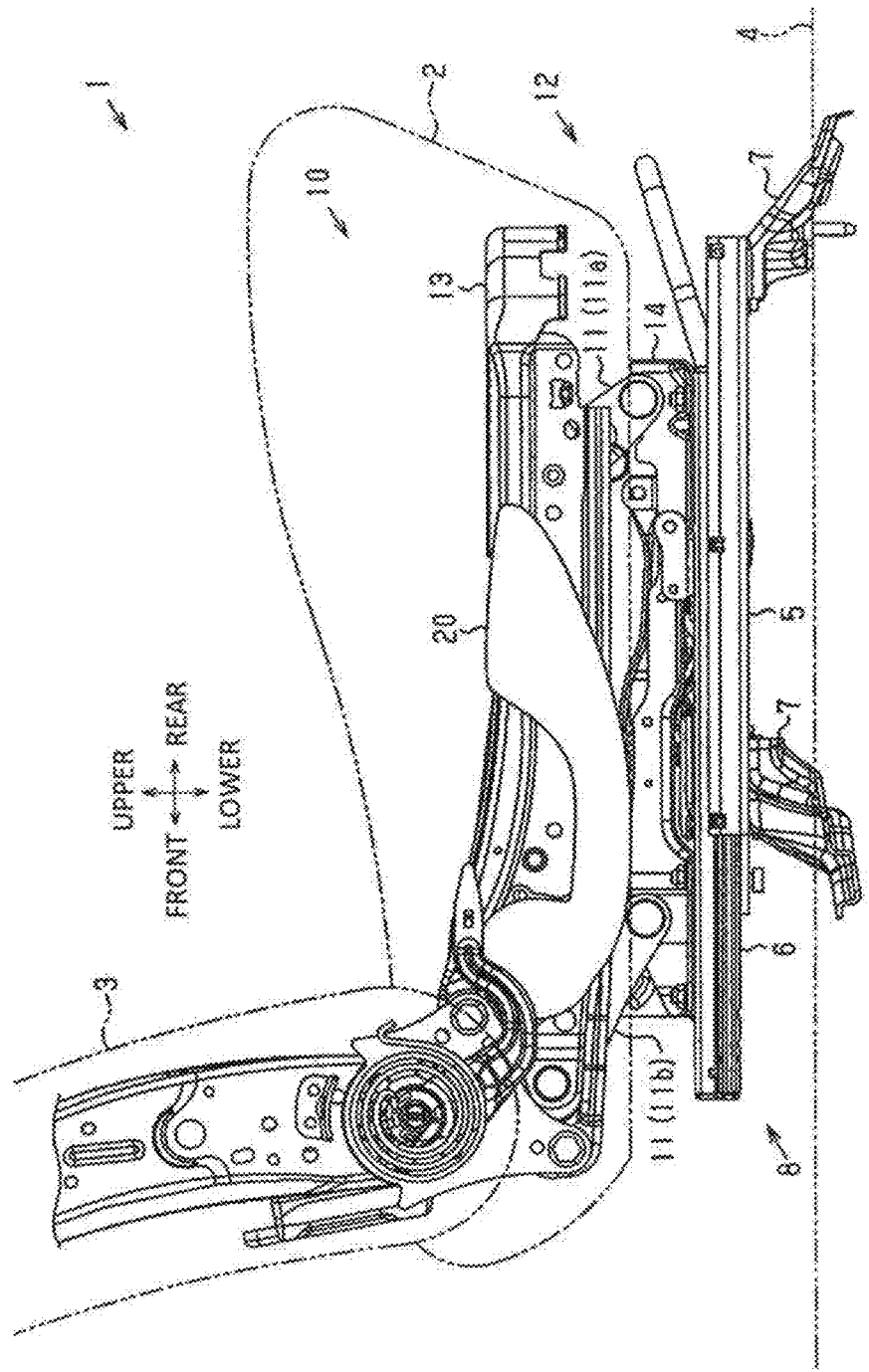
FIG. 1 is an outer side view illustrating a schematic configuration of a lifter device according to a first embodiment.
Figure 2:
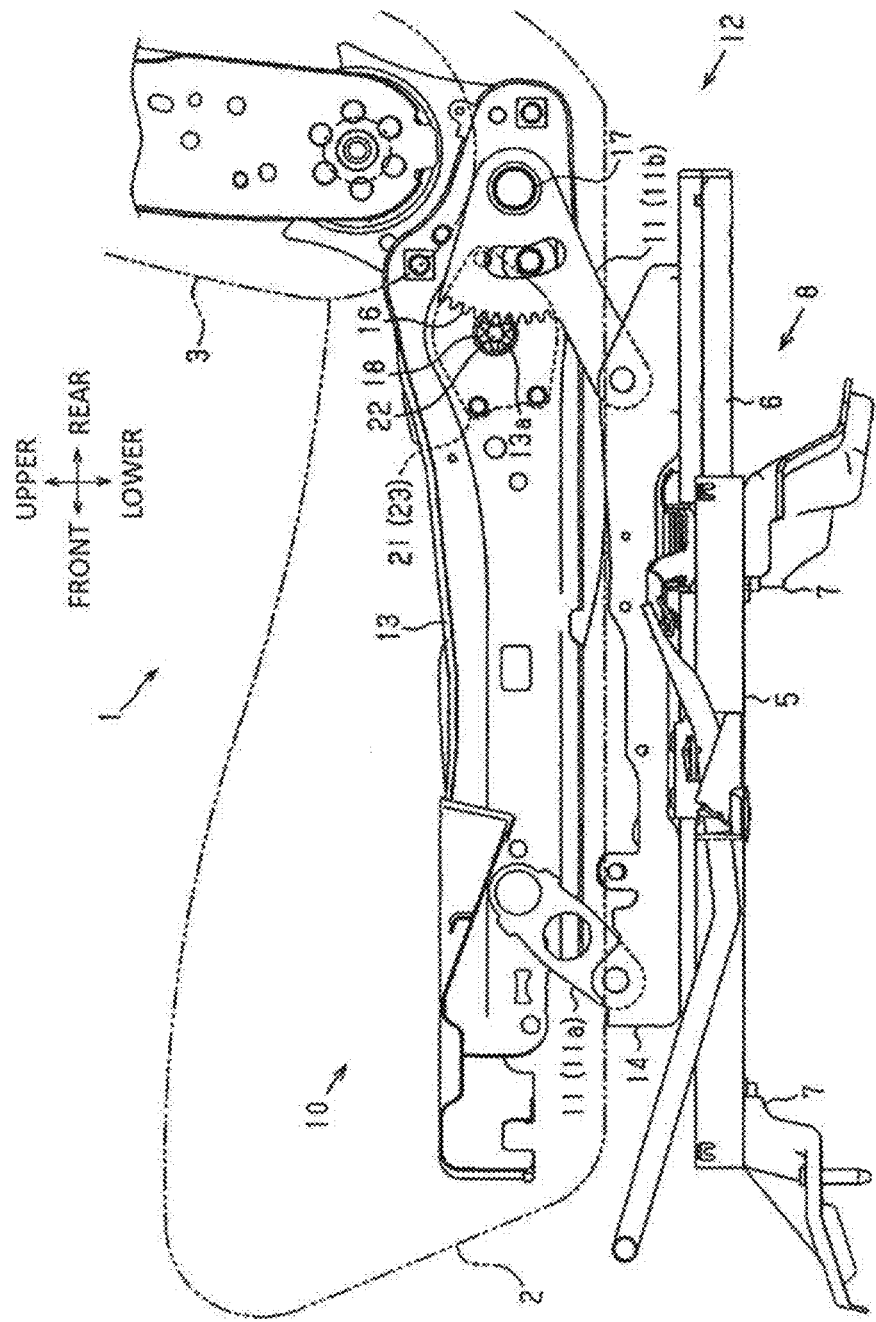
FIG. 2 is a side view of a structure on the same outer side as viewed from a seat inner side.
Figure 3:
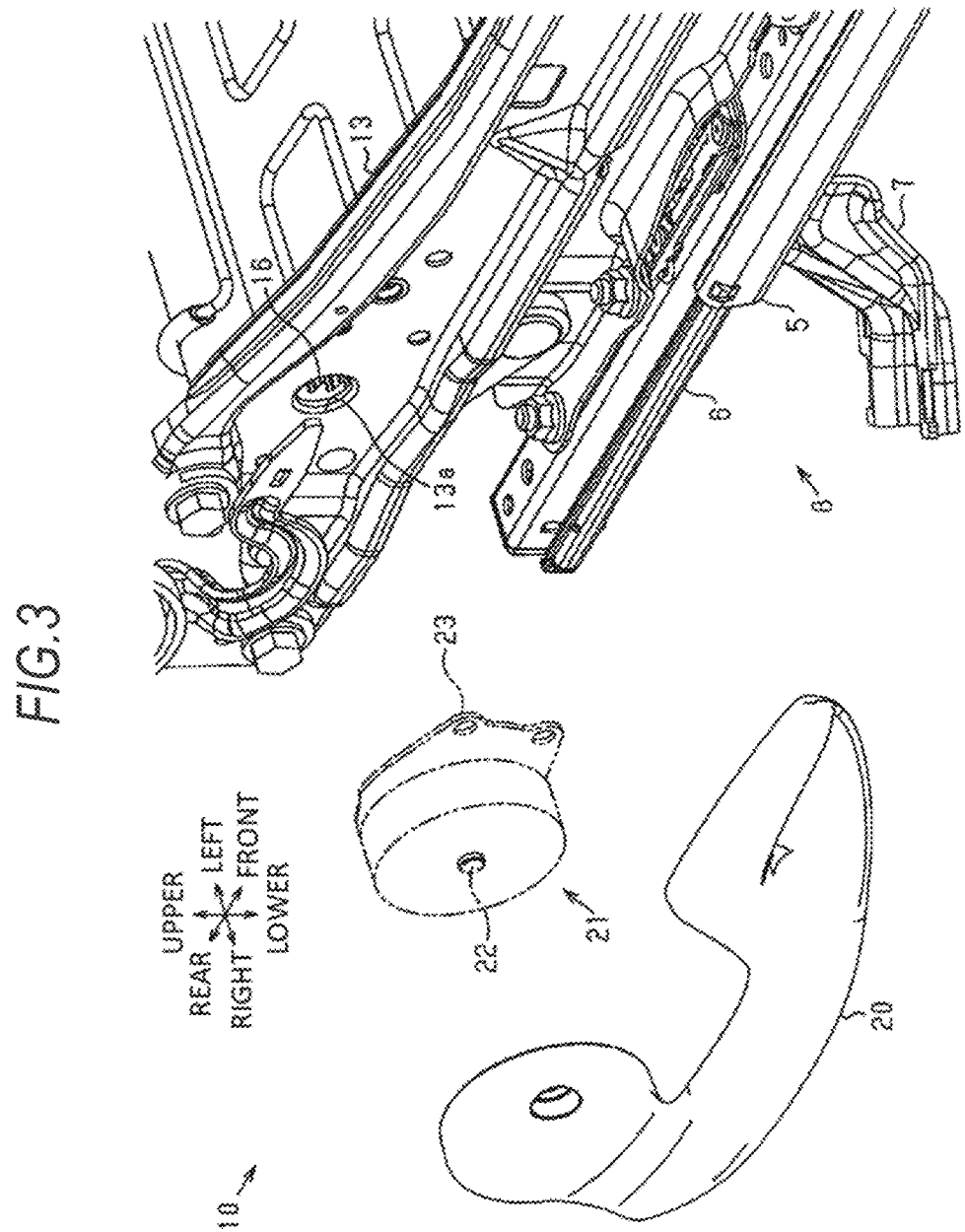
FIG. 3 is an exploded perspective view illustrating a state in which an operation handle and a rotation control device are detached from a seat frame.

FIGS. 1 to 3 illustrate a vehicle seat 1 (hereinafter simply referred to as "seat") to which the lifter device 10 according to the first embodiment of the present invention is applied. In the drawings, directions of portions in a state where the seat 1 is mounted to a vehicle are indicated by arrows. Descriptions on directions are made with reference to these directions in the following description.

As illustrated in FIG. 1, the seat 1 includes a seat back 3 serving as a backrest on a rear side of a seat cushion 2 serving as a sitting portion. The seat back 3 is rotatable in a front-rear direction relative to the seat cushion 2. The seat cushion 2 includes the lifter device 10 and a seat slide device 8 at a lower portion thereof, and is fixed to a vehicle floor 4 via a bracket 7.

As illustrated in FIG. 2, the seat slide device 8 is a known device in the related art and includes a pair of left and right upper rails 6 and a pair of left and right lower rails 5 coupled with each other to be slidable back and forth. The pair of left and right upper rails 6 and the pair of left and right lower rails 5 extend in the front-rear direction. The left and right lower rails 5 are fixedly supported by a pair of front and rear brackets 7 fixed to the floor 4. The lifter device 10 is provided above the left and right upper rails 6.

As illustrated in FIGS. 2 and 3, the lifter device 10 includes a base member 14 fixed on the upper rails 6 and a plurality of link members 11 rotatably coupled to front and rear end portions of the upper rails 6. The base member 14 and the link members 11, together with a side frame 13 serving as a framework member of the seat cushion 2, constitute a link mechanism 12 that is a four-bar linkage. Among the plurality of link members 11, a rear link 11b on a right rear side includes a sector gear 16 (corresponding to "input gear" of the present invention) and is rotated in the front-rear direction via a pinion gear 18 of a rotation control device 21. A rotation shaft of the rear link 11b on the right rear side relative to the side frame 13 is formed by a torque rod 17. A rear link (not illustrated) on a left rear side is also rotated in synchronization with the rear link 11b via the torque rod 17.

The side frame 13 has a through hole 13a for inserting the pinion gear 18. The rotation control device 21 is fixed to a right wall of the side frame 13 by inserting the pinion gear 18 into the through hole 13a. The rotation control device 21 is rotatable in forward and reverse directions via an operation handle 20 that is provided on a right side of the seat cushion 2 and extends in the front-rear direction. When the operation handle 20 is rotated upward from a neutral position, the rotation control device 21 is rotated in a direction in which the rear link 11b is erected from the base member 14, and when the operation handle 20 is rotated downward from the neutral position, the rotation control device 21 is rotated in a direction in which the rear link 11b is turned down on the base member 14. With the configuration of the above four-bar linkage, a front link 11a is also rotated in response to the rotation of the rear link 11b, so that a height position of the seat cushion 2 relative to the floor 4 is adjusted in response to the operation of the operation handle 20.

<Configuration of Rotation Control Device 21>

Figure 4:
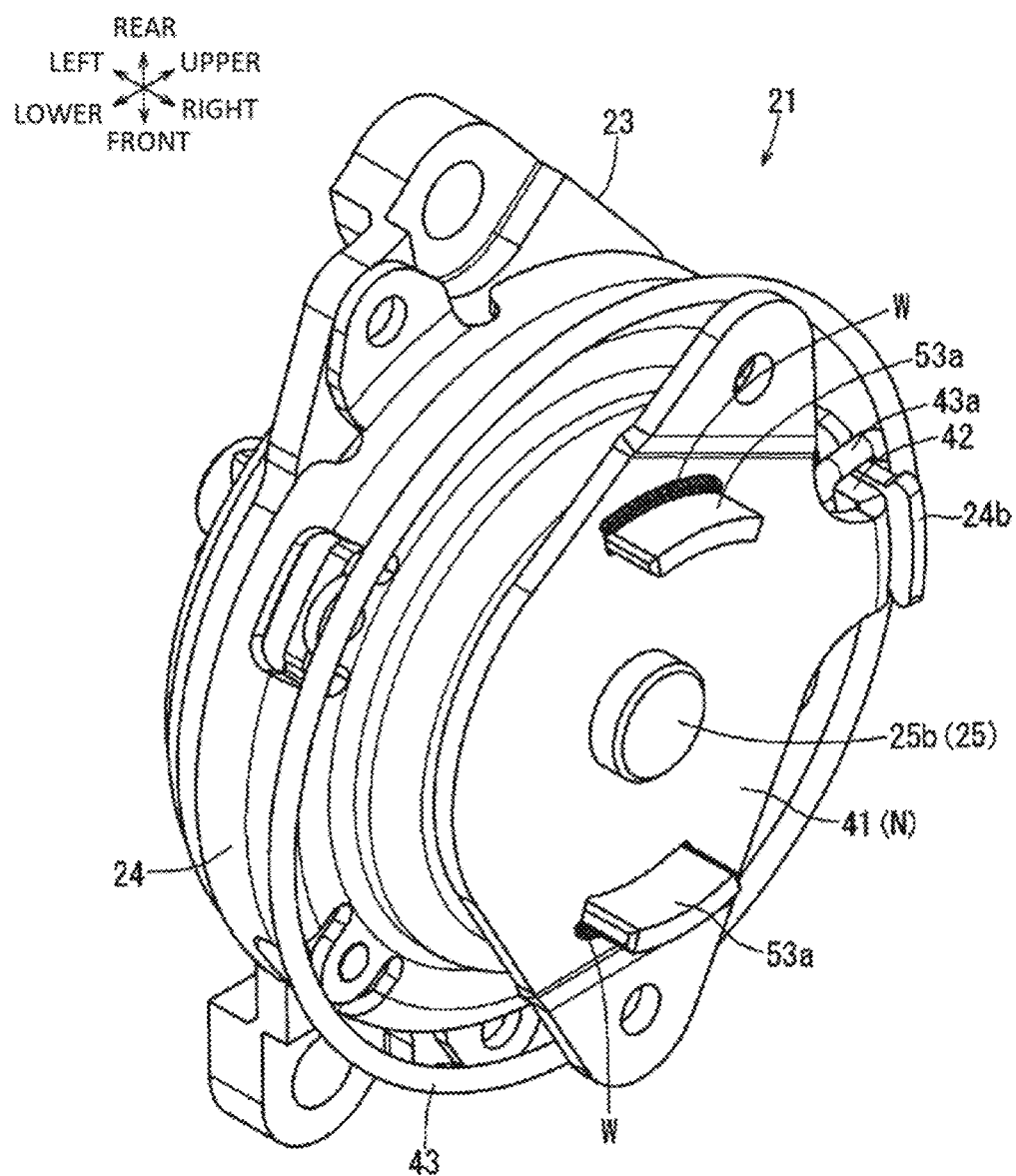
FIG. 4 is a perspective view of the rotation control device as viewed from a seat outer side.
Figure 5:
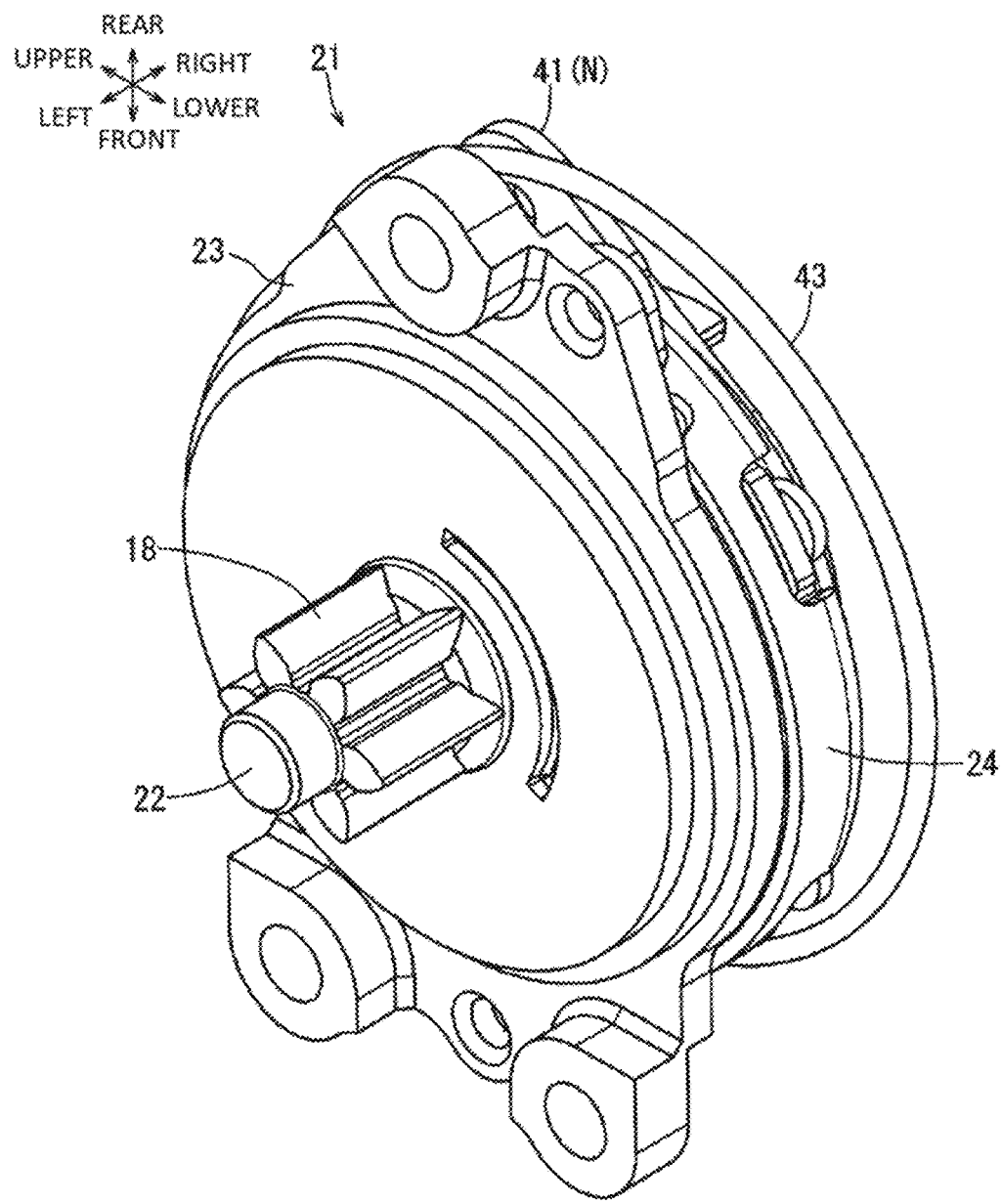
FIG. 5 is a perspective view of the rotation control device as viewed from the seat inner side.
Figure 6:
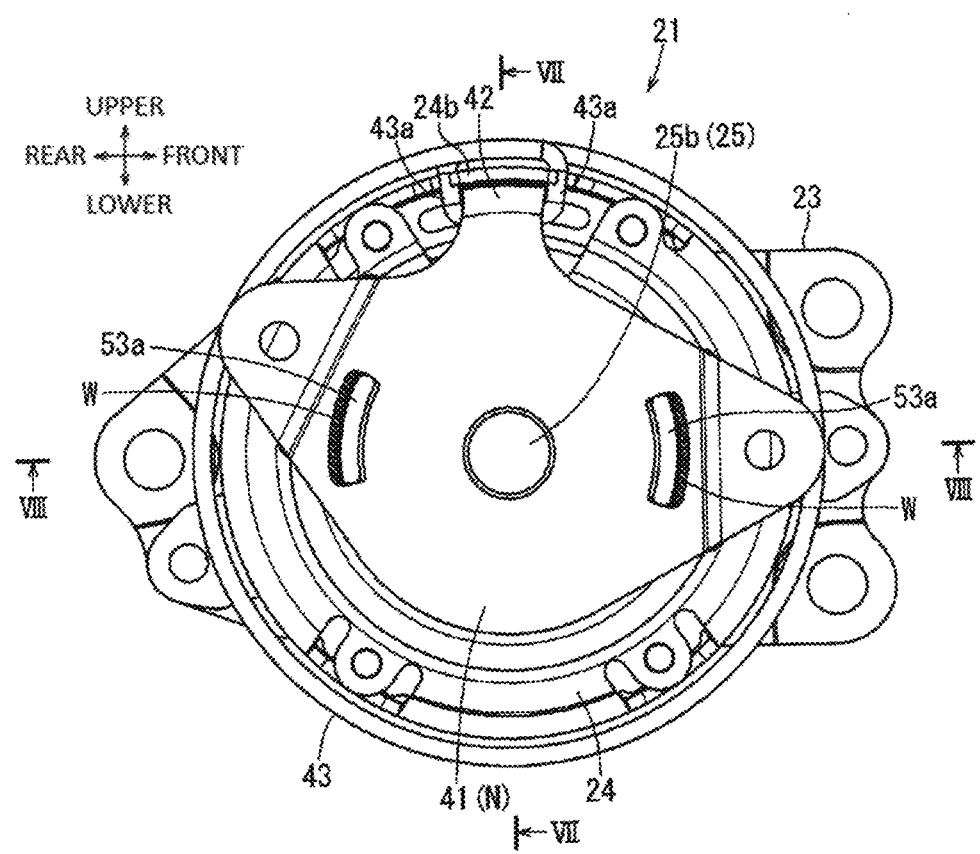
FIG. 6 is a front view of the rotation control device as viewed from the seat outer side.
Figure 7:
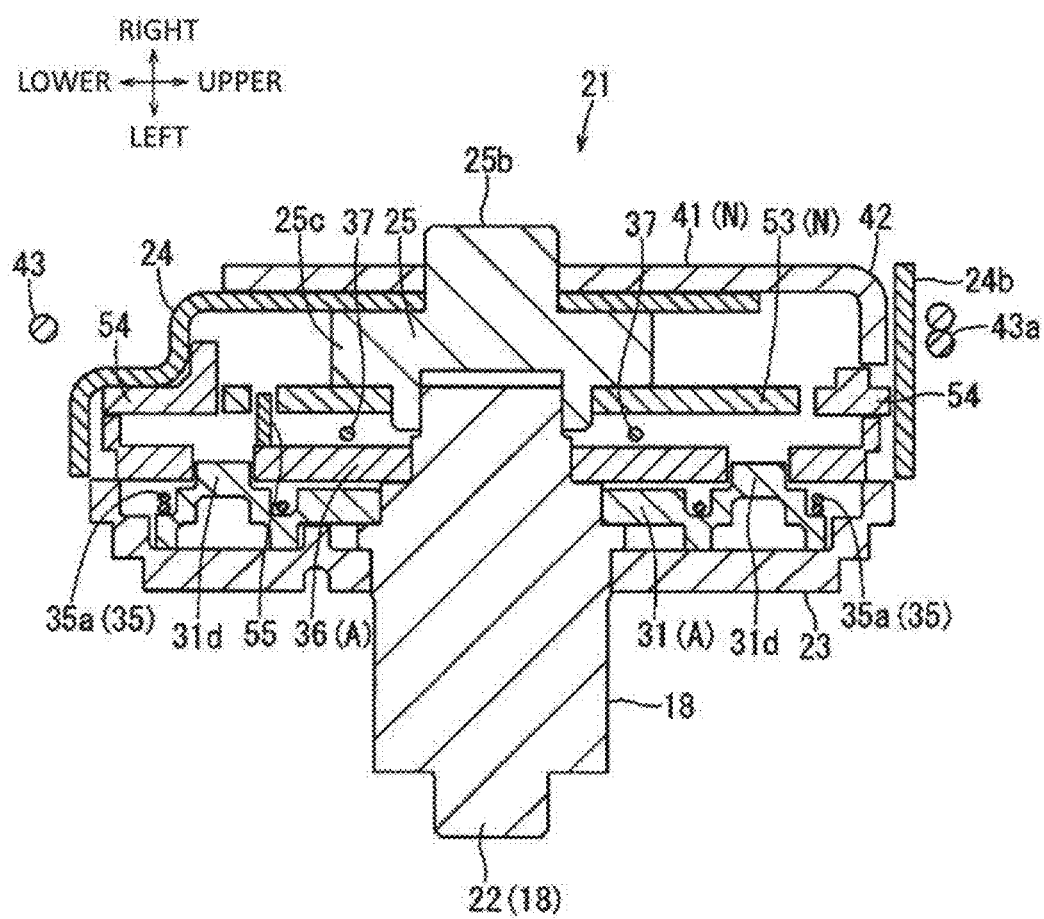
FIG. 7 is a sectional view taken along a line VII-VII in FIG. 6.
Figure 8:
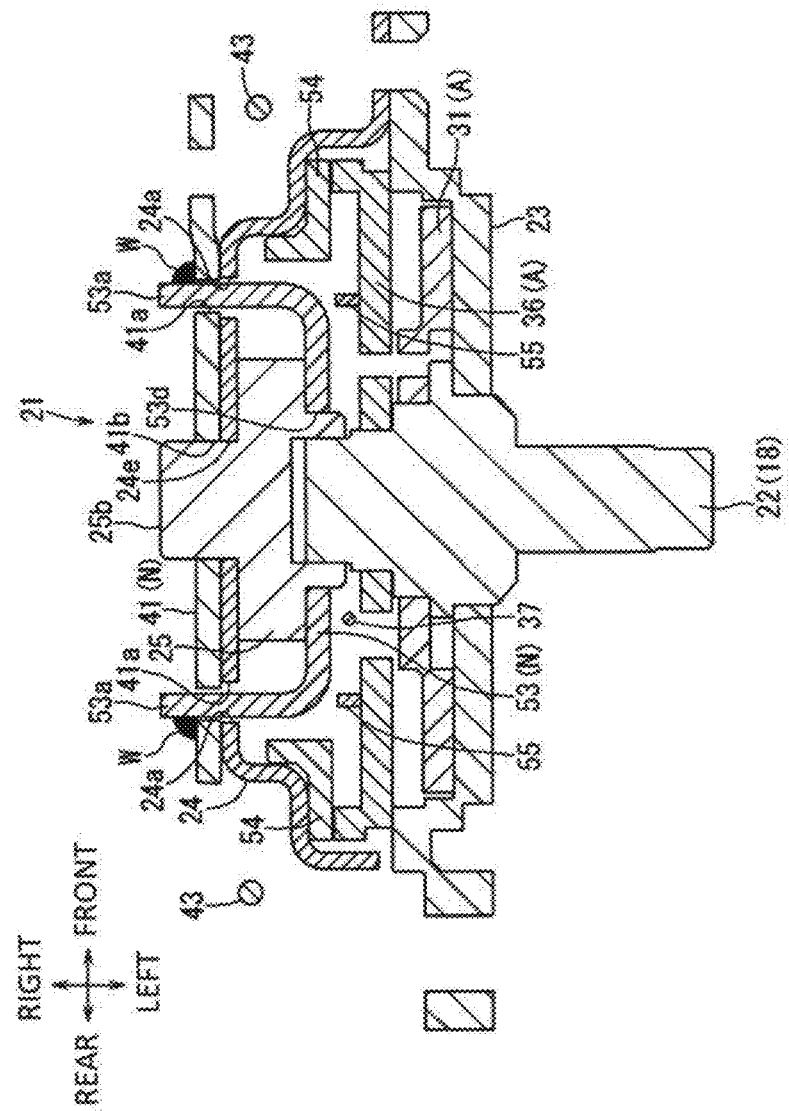
FIG. 8 is a sectional view taken along a line VIII-VIII in FIG. 6.

FIGS. 4 to 6 illustrate a state in which the rotation control device 21 is detached from the seat cushion 2. Hereinafter, a configuration of the rotation control device 21 is described with reference to FIGS. 4 to 15. For reference numerals of constituent members of the rotation control device 21 to be described below, references will be made to any of FIGS. 4 to 15 as appropriate.

The rotation control device 21 is assembled such that a rotation shaft 22 penetrates a center hole 23c of a support member 23 (corresponding to "base" of the present invention) serving as a base member and the pinion gear 18 protrudes from a left side surface of the support member 23. The support member 23 is fixed to the side frame 13 in a state where the pinion gear 18 penetrates the through hole 13a of the side frame 13.

A right side surface of the support member 23 is embossed leftward to form a guide concave portion 23b to accommodate a disc-shaped lock plate 31 (corresponding to "rotation member" of the present invention), and has a circular container shape as a whole. The guide concave portion 23b has, on its inner circumferential surface, inner teeth 34 (corresponding to "base gear" of the present invention) that mesh with pawls 32, 33 (corresponding to "lock pawl" of the present invention) to be described later. The lock plate 31 has, at its center, a spline hole 31b that meshes with a spline 22b of the rotation shaft 22. Therefore, the lock plate 31 is rotated in synchronization with the rotation shaft 22.

The lock plate 31 includes, on an outer circumferential portion on its right side surface, one protrusion 31d that protrudes and dispersedly located on each of an upper side and a lower side, and two protrusions 31e that protrude and dispersedly located on each of a front side and a rear side. The protrusions 31e are fitted into through holes 32a, 33a of the pawls 32, 33 so that the pawls 32, 33 are swingable about the respective protrusions 31e (corresponding to "shaft portion" of the present invention). The protrusion 31d is fitted into a winding portion 35a of a torsion spring 35, and each of end portions 35b of the torsion spring 35 is engaged with a corresponding one of the pawls 32, 33 so that the pawls 32, 33 are biased toward an outer circumferential side of the lock plate 31. Therefore, engagement end portions 32c, 33c (corresponding to "outer teeth" of the present invention) forming outer teeth of the pawls 32, 33 are always meshed with the inner teeth 34 of the support member 23.

Figure 11:
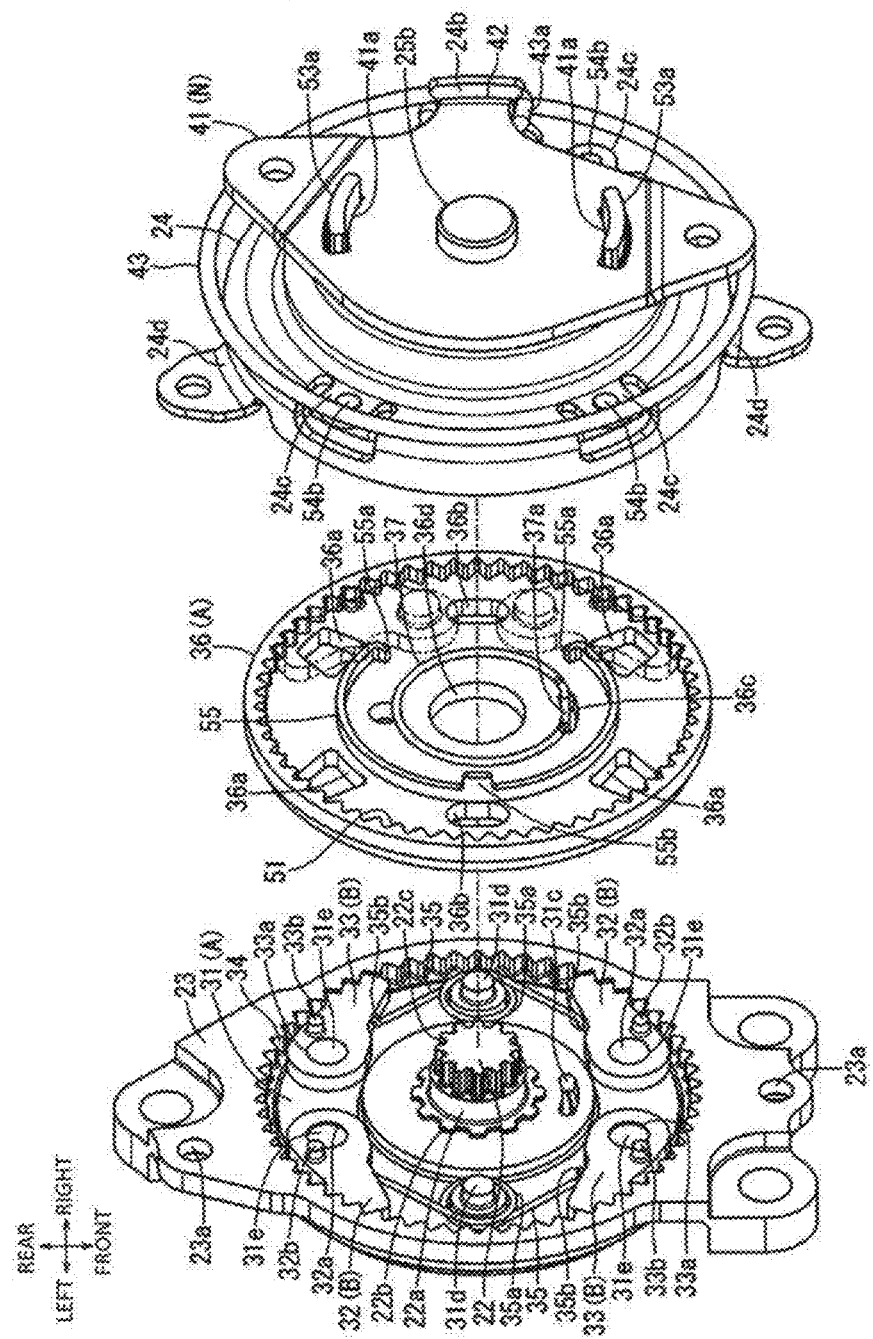
FIG. 11 is an exploded perspective view illustrating a further assembled state between some components illustrated in FIG. 10.

FIG. 11 illustrates a state in which the lock plate 31 to which the pawls 32, 33 are coupled is assembled to the support member 23 as described above.

<Configuration of Rotation Control Device 21>

A cover 24 has a rightward bulging container shape as a whole, and is provided with, on its right side surface, an outer plate 41 that constitutes an outer piece of an input member N coupled to and rotated by the operation handle 20. A round bar-shaped protruding pin 25b protrudes rightward from a center of a substantially cylindrical shaft member 25, and is inserted from a left side through a through hole 24e in a center of the cover 24 and a center hole 41b of the outer plate 41. A pair of arms 53a are formed on an inner plate 53 that constitutes an inner piece of the input member N, and are inserted from the left side into a pair of arc-shaped openings 24a formed in the cover 24 and a pair of arc-shaped through holes 41a formed in the outer plate 41. The pair of arms 53a are inserted into the corresponding through holes 41a of the outer plate 41 to a position in which a flange portion 25c of the shaft member 25 and the cover 24 are interposed between the inner plate 53 and the outer plate 41 in the left-right direction (corresponding to "thrust direction" of the present invention). In this position (interposed position), top protruding parts of the pair of arms 53a inserted into the corresponding through holes 41a are welded and coupled to peripheral portions on outer circumferential sides of the corresponding through holes 41a of the outer plate 41 (welding portion W (corresponding to "coupling portion" of the present invention): see FIG. 8).

By the above coupling, the cover 24 and the outer plate 41 are slidably coupled to each other via the shaft member 25. The outer plate 41 includes an engagement piece 42 bent leftward on an upper portion of the outer plate 41. The engagement piece 42 is aligned to an inner peripheral side of an engagement piece 24b protruding on a right side of the cover 24. Surrounds of the engagement pieces 42, 24b are wrapped by end portions 43a of a torsion spring 43. Therefore, when the outer plate 41 is rotated by the operation handle 20, the engagement piece 42 moves away from the engagement piece 24b in a circumferential direction. When the rotation operation is released, a biasing force of the torsion spring 43 causes the engagement piece 42 and the engagement piece 24b to overlap each other in the circumferential direction and the outer plate 41 is returned to a position before the rotation operation.

The cover 24 is provided with, on a left side, the inner plate 53 and a cam member 54 such that the inner plate 53 and the cam member 54 are accommodated in the container shaped cover 24. With these components interposed between the cover 24 and the support member 23 together with the lock plate 31 and a rotation transmission plate 36 (corresponding to "release member" of the present invention), the cover 24 is fixed to the support member 23. Leg portions 24d of the cover 24 are fixed to through holes 23a of the support member 23 by rivets (not illustrated).

The cam member 54 has a substantial ring shape, and includes four pins 54b on a right side surface and a cam protrusion 54a protruding on an upper side of an inner circumference of the ring shape. The pins 54b are fitted into corresponding through holes provided on protruding pieces 24c of the cover 24, so that the cam member 54 is fixed inside the cover 24.

The inner plate 53 includes the rightward extending arm 53a on each of front and rear portions. The arms 53a pass through the corresponding openings 24a of the cover 24 and penetrate the corresponding through holes 41a of the outer plate 41 as described above. The openings 24a of the cover 24 have a length larger than that of the arms 53a in a circumferential direction, and the corresponding through holes 41a of the outer plate 41 have substantially the same length as that of the arms 53a in the circumferential direction. Therefore, the inner plate 53 is rotated integrally with the outer plate 41, and a rotation operation in the circumferential direction is locked in a position where the arms 53a come into contact with circumferential end portions of the openings 24a of the cover 24. A pair of feed claws 52 are swingably coupled to a left side surface of the inner plate 53 by fitting hinge portions 52b of the feed claws 52 into corresponding through holes 53b of the inner plate 53.

<Configuration of Rotation Control Device 21 (Rotation Transmission Plate 36)>

The substantially disc-shaped rotation transmission plate 36 is provided on a left side of the inner plate 53, and is interposed between the inner plate 53 and the lock plate 31. The rotation transmission plate 36 has, in its disc plate surface portion, four substantially rectangular engagement holes 36a corresponding to the pawls 32, 33, and pins 32b, 33b (corresponding to "pressed portion" of the present invention) of the pawls 32, 33 are inserted into the engagement holes 36a to be engaged in a circumferential direction. The rotation transmission plate 36 further has, in the disc plate surface portion, two elliptical engagement holes 36b corresponding to the protrusions 31d, and the protrusions 31d are inserted into the engagement holes 36b to be engaged in the circumferential direction.

Further, the rotation transmission plate 36 is provided with, on its right side surface, torsion springs 37, 55 around a center hole 36d The torsion spring 37 has an end portion 37a bent leftward and inserted through an elongated hole 36c of the rotation transmission plate 36 and an elongated hole 31c of the lock plate 31, and exerts a biasing force in two directions in a circumferential direction across the elongated holes 36c, 31c. The torsion spring 37 maintains a rotation angle of the rotation transmission plate 36 relative to the lock plate 31 in a neutral position by the biasing force. On the other hand, the torsion spring 55 has end portions 55a that apply biasing forces from a radially inner side to projections 52d of the feed claws 52 to press the feed claws 52 toward an outer circumferential side. The torsion spring 55 has a protrusion 55b protruding rightward in a central portion thereof. The protrusion 55b is inserted into and engaged with an engagement hole 53c formed in a central portion on a lower end of the inner plate 53. Therefore, the projections 52d of the feed claws 52 are always pressed against the end portions 55a of the torsion spring 55, and engagement end portions 52a mesh with inner teeth 51 of the rotation transmission plate 36. The inner teeth 51 of the rotation transmission plate 36 and the inner teeth 34 of the support member 23 have the same number of teeth.

Figure 12:
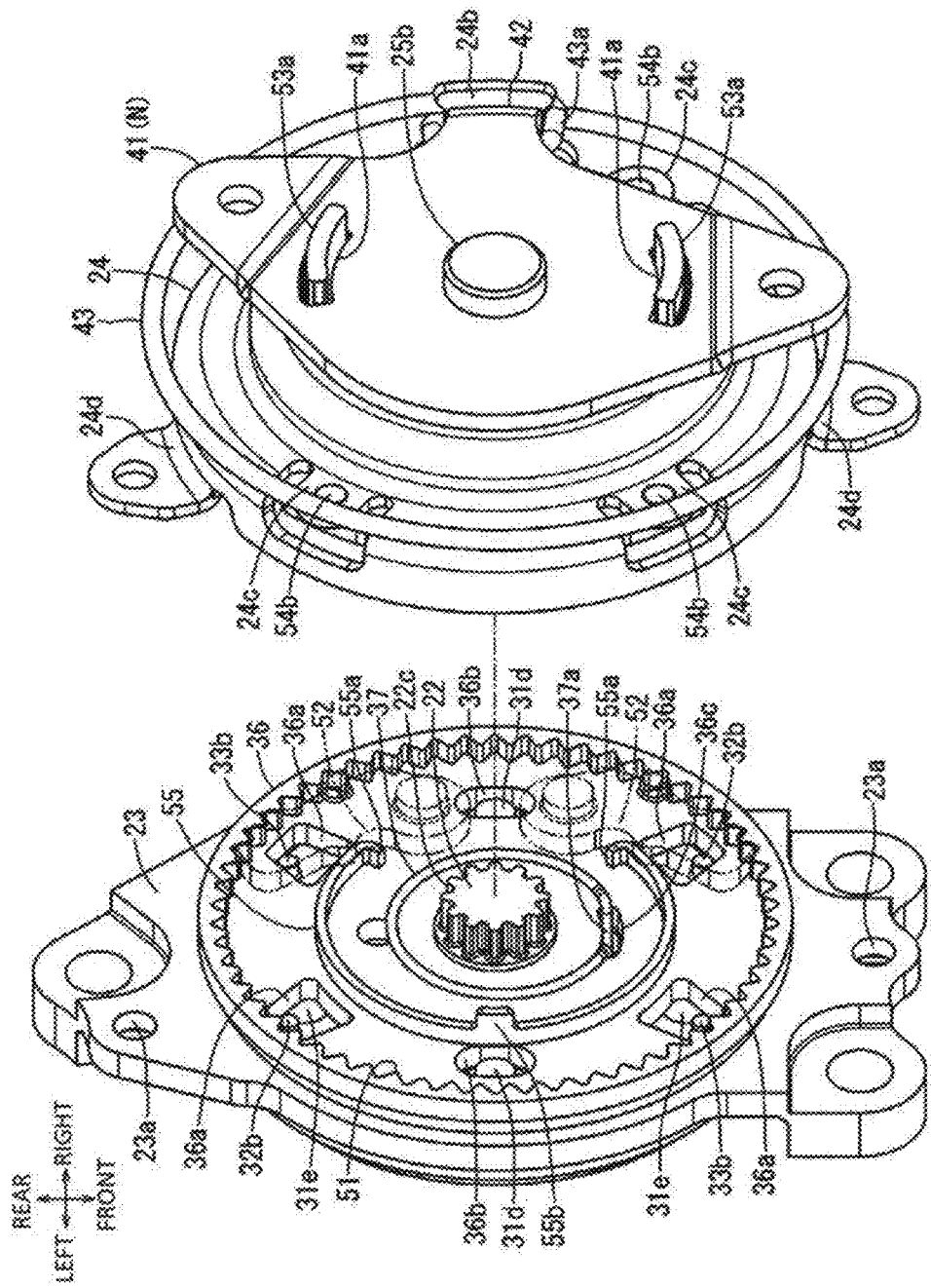
FIG. 12 is an exploded perspective view illustrating a further assembled state between some components illustrated in FIG. 11.
Figure 13:
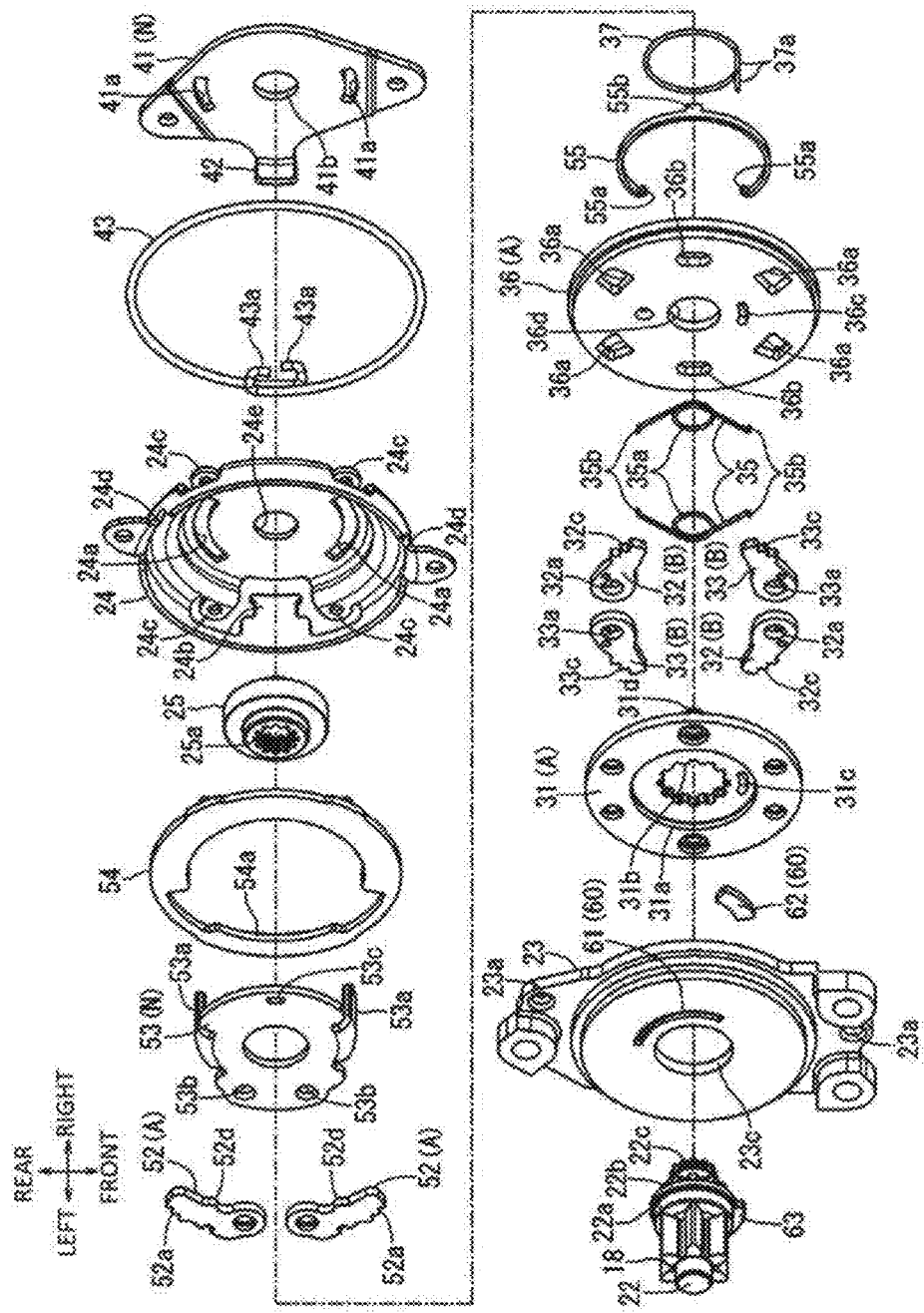
FIG. 13 is an exploded perspective view of the rotation control device as viewed from the seat inner side.
Figure 14:
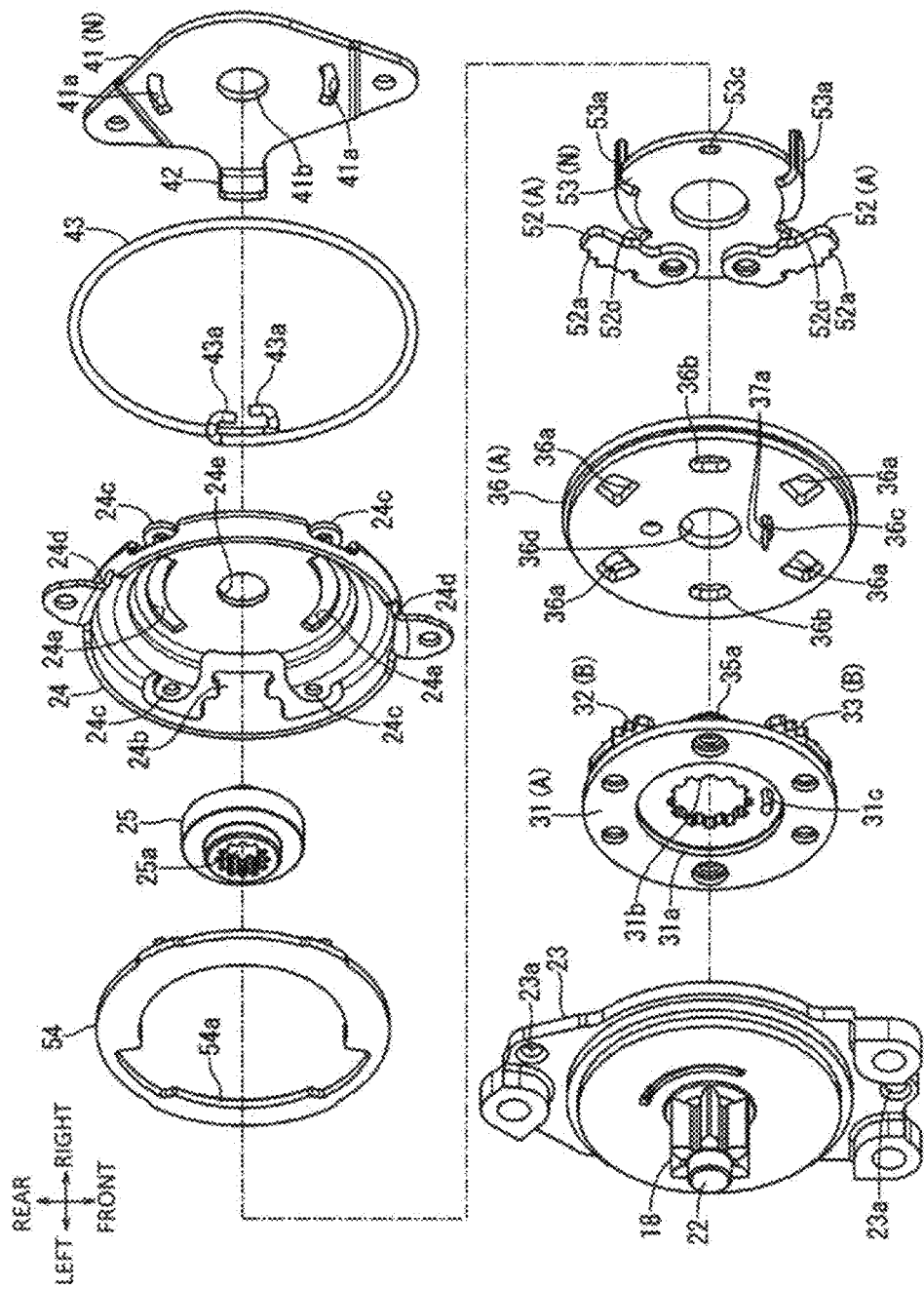
FIG. 14 is an exploded perspective view illustrating an assembled state between some components illustrated in FIG. 13.
Figure 15:
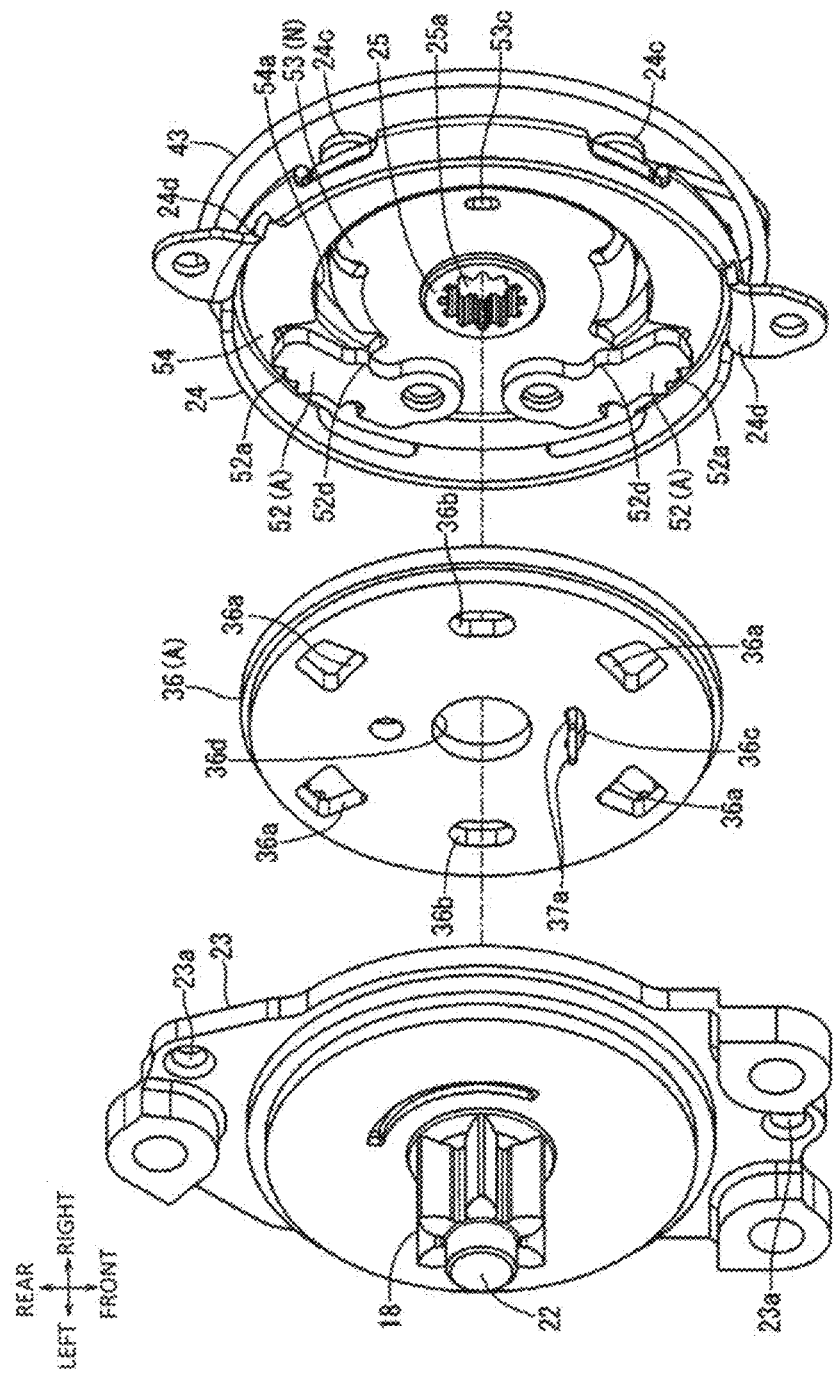
FIG. 15 is an exploded perspective view illustrating a further assembled state between some components illustrated in FIG. 14.

FIGS. 11 and 15 illustrate a state in which the outer plate 41, the inner plate 53, the cam member 54, the feed claws 52, the inner teeth 51 of the rotation transmission plate 36, and the torsion spring 55 are assembled to the cover 24 as described above. FIG. 12 illustrates a state in which the rotation transmission plate 36 is assembled to the lock plate 31. Although FIGS. 11 and 12 do not illustrate an assembly procedure of the rotation control device 21, the rotation control device 21 is finally assembled by fitting a spline 22c of the rotation shaft 22 into a spline hole 25a of the shaft member 25 and fixing the cover 24 to the support member 23. The spline hole 25a of the shaft member 25 is formed in an exposed left end portion of the shaft member 25 that passes through the center hole 53d (see FIG. 8) of the inner plate 53 from a right side.

Figure 9:
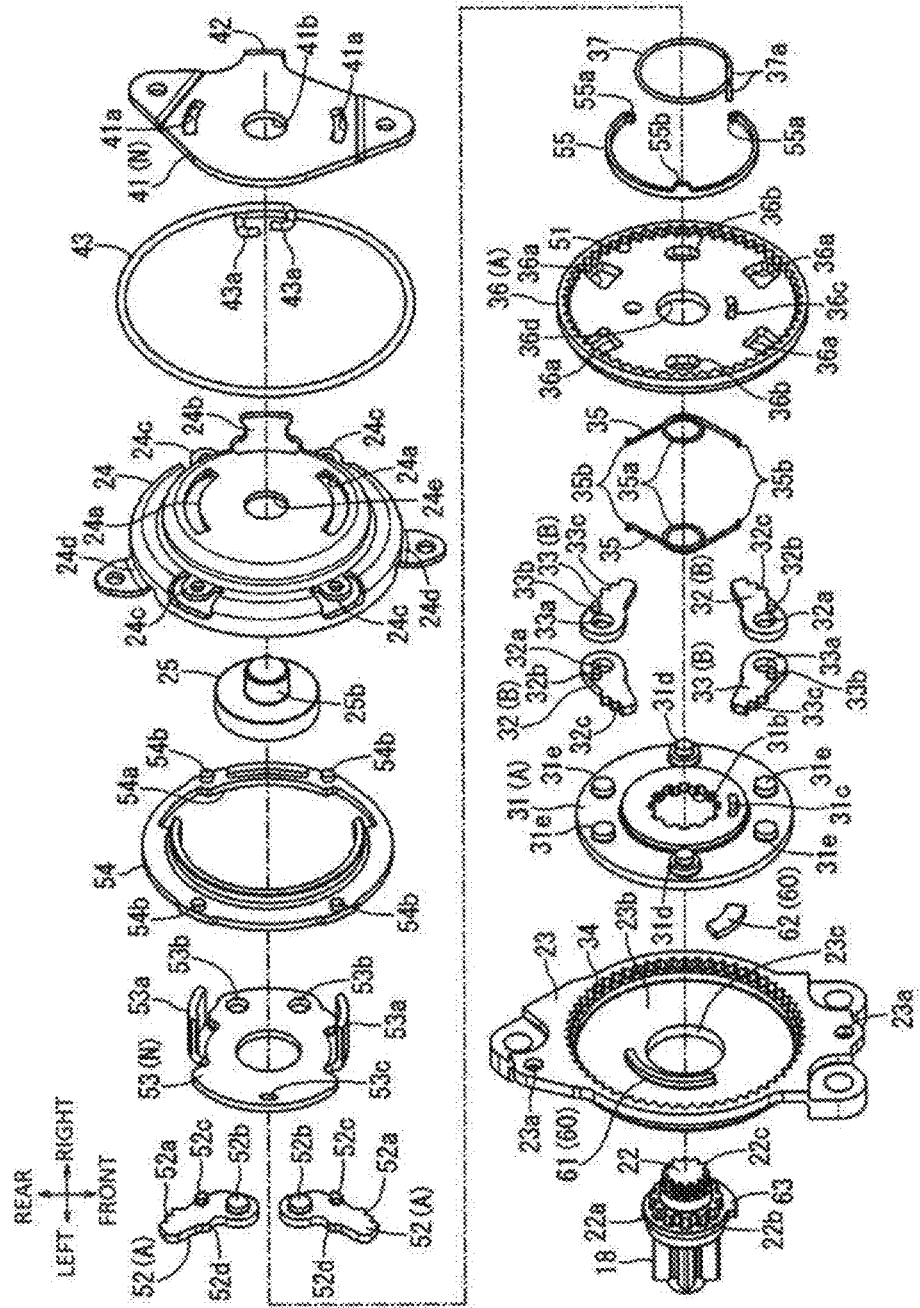
FIG. 9 is an exploded perspective view of the rotation control device as viewed from the seat outer side.
Figure 10:
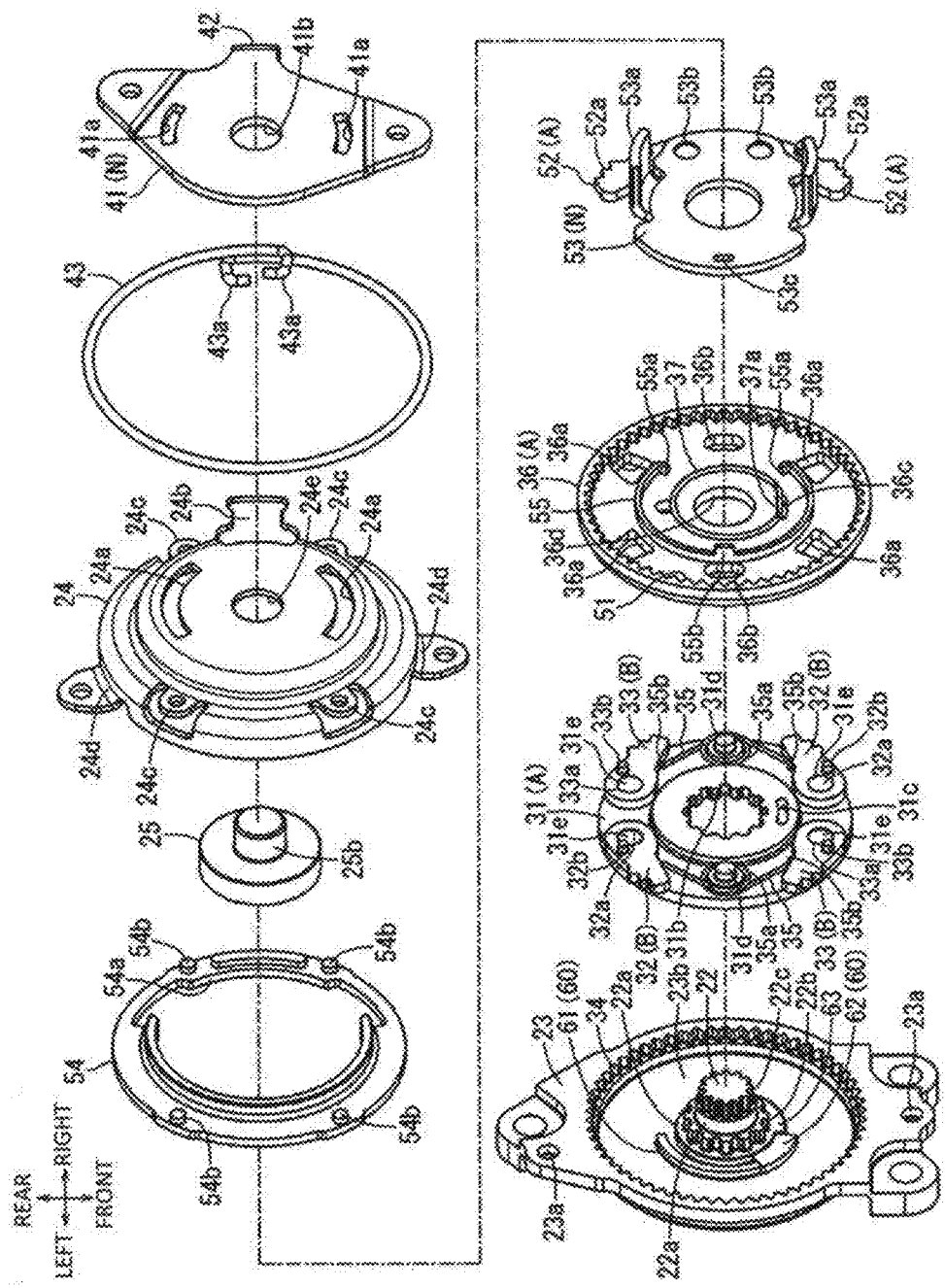
FIG. 10 is an exploded perspective view illustrating an assembled state between some components illustrated in FIG. 9.

Herein, as illustrated in FIG. 9, a power transmission system is configured as a feed unit A, which includes the feed claws 52, the rotation transmission plate 36, and the lock plate 31 which are coupled between the outer plate 41 and the pinion gear 18 and transmit rotation of the outer plate 41 to the pinion gear 18 as feed rotation. Further, a mechanism unit is configured as a lock unit B, which includes the pawls 32, 33 that stops the rotation of the pinion gear 18 feed-rotated by the feed unit A relative to the support member 23

<Configuration of Rotation Control Device 21 (Stopper 60)>

A concentric outer circumferential surface 22*a* having no gear shape is formed between the pinion gear 18 and the spline 22*b* of the rotation shaft 22, and a rotation shaft-side projection 63 protrudes radially in a specific angular position on an outer circumferential side of the outer circumferential surface 22*a*. When the rotation shaft 22 is inserted into the center hole 23*c* of the support member 23, the rotation shaft-side projection 63 is exposed on a right side surface of the guide concave portion 23*b* of the support member 23.

The right side surface of the guide concave portion 23*b* of the support member 23 is embossed to form an arc-shaped support member-side projection 61. On the other hand, the lock plate 31 is embossed to form a sliding surface portion 31*a* around and concentric with the spline hole 31*b* of the lock plate 31. When the lock plate 31 rotates relative to the support member 23, an outer circumference of the support member-side projection 61 slides on an inner circumference of the sliding surface portion 31*a*. An engagement piece 62 is disposed to slide in a gap between the inner circumference of the sliding surface portion 31*a* and the outer circumferential surface 22*a* of the rotation shaft 22.

Figure 28:
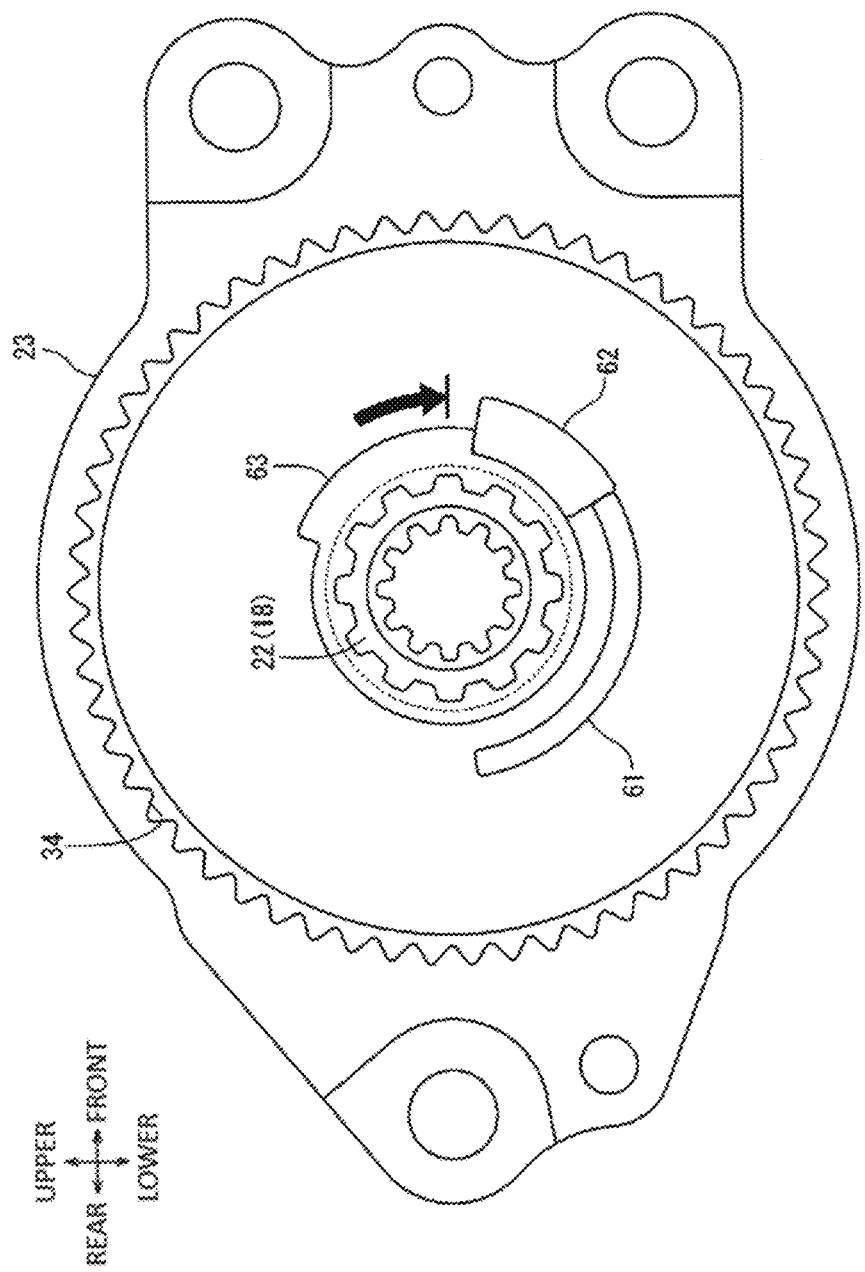
FIG. 28 illustrates a state in which rotation of the pinion gear in a push-down operation direction is locked by a stopper.
Figure 29:
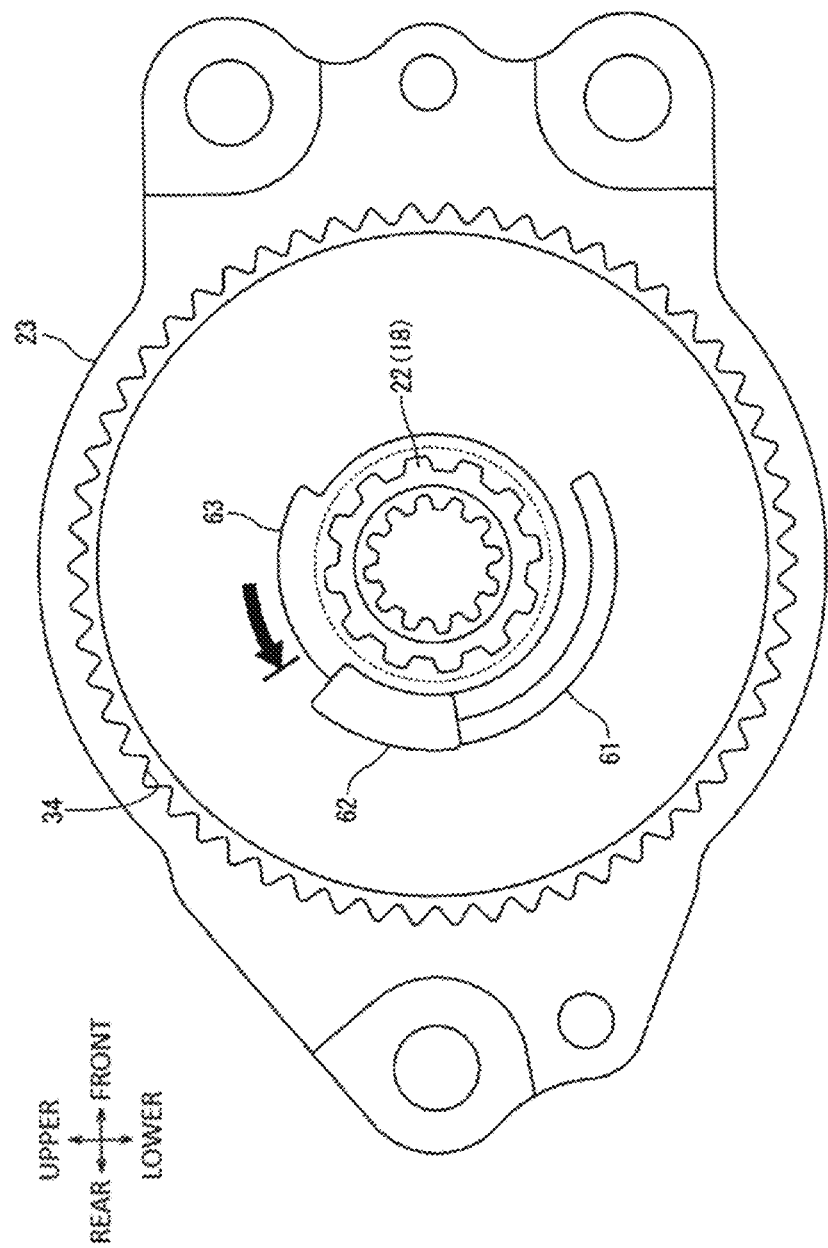
FIG. 29 illustrates a state in which rotation of the pinion gear in a pull-up operation direction is locked by the stopper.
Figure 30:
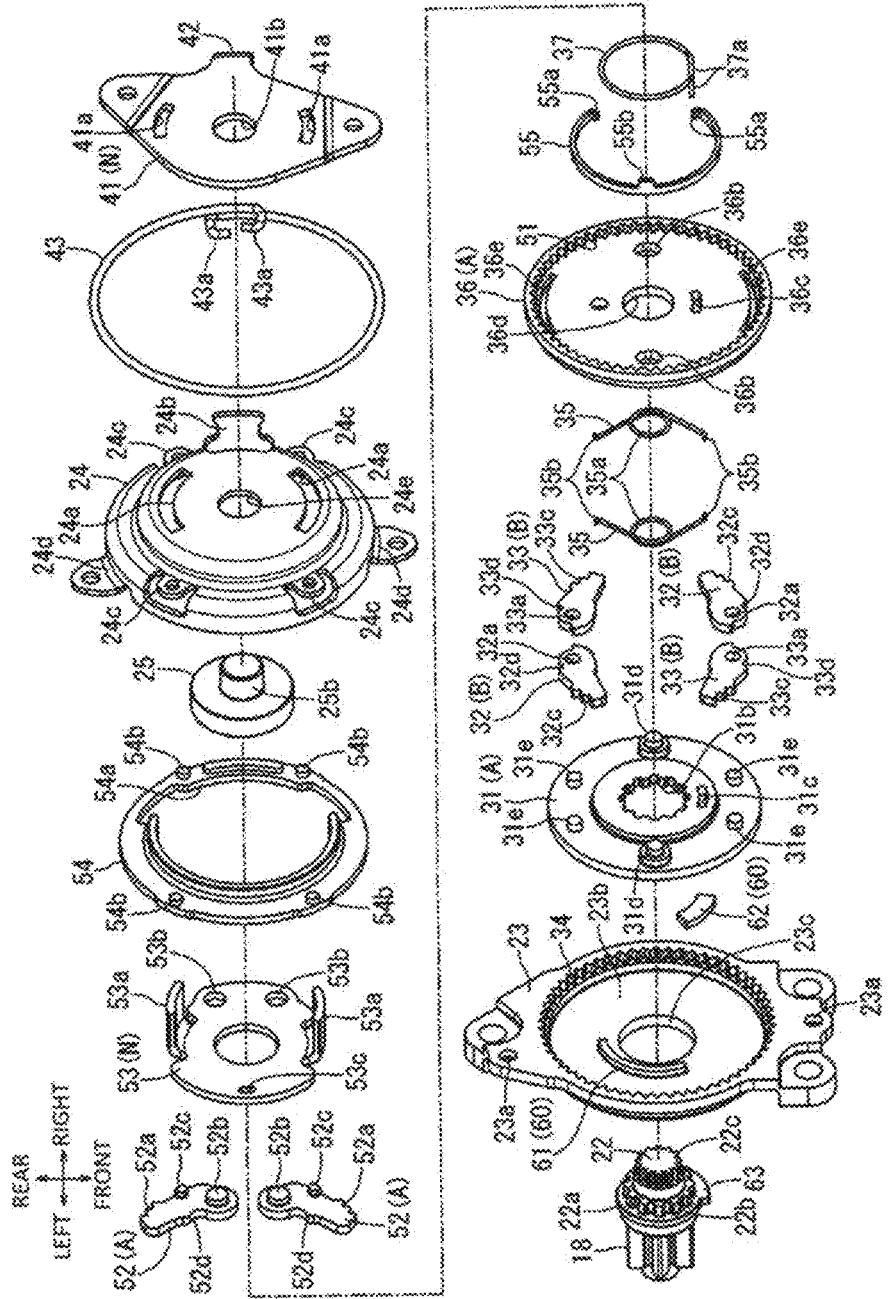
FIG. 30 is an exploded perspective view of a rotation control device of a lifter device as viewed from a seat outer side according to a second embodiment.
Figure 31:
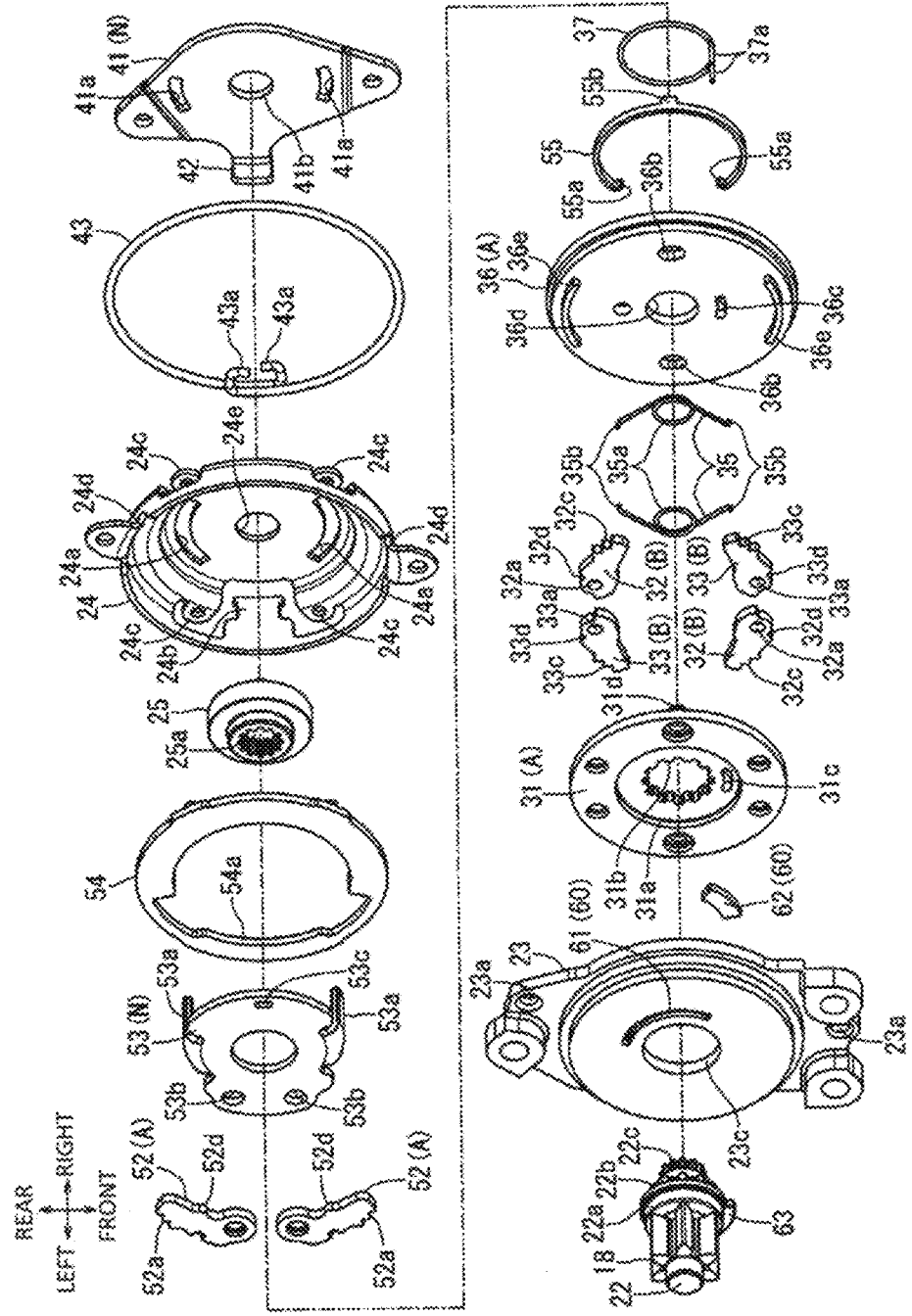
FIG. 31 is an exploded perspective view of the rotation control device as viewed from a seat inner side.

Therefore, when the rotation shaft 22 is rotated in a lowering direction by the operation of the rotation control device 21 and reaches a lower limit position as illustrated in FIG. 28, the rotation shaft-side projection 63 abuts against an end portion of the support member-side projection 61 with the engagement piece 62 interposed therebetween so that further rotation of the output shaft 22 is stopped. When the rotation shaft 22 is rotated in a lifting direction and reaches an upper limit position as illustrated in FIG. 29, the rotation shaft-side projection 63 abuts against an opposite end portion of the support member-side projection 61 with the engagement piece 62 interposed therebetween so that further rotation of the rotation shaft 22B is stopped.

<Operation of Rotation Control Device 21 (Operation Handle 20 Not Operated)>

Hereinafter, a height adjustment operation of the seat cushion 2 via the rotation control device 21 will be described with reference to FIGS. 16 to 27.

Figure 16:
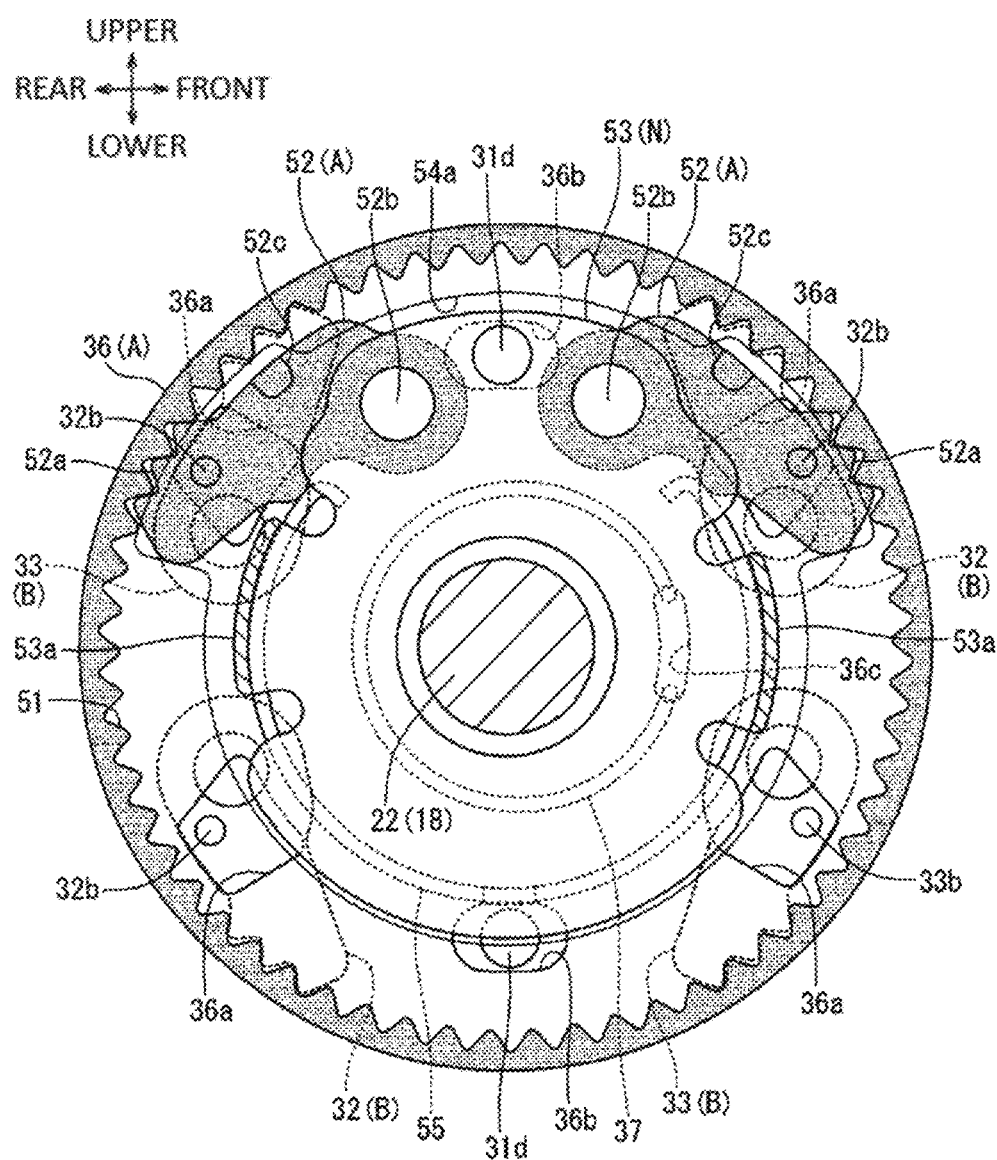
FIG. 16 illustrates a state of a feed unit of the rotation control device when the operation handle is in a neutral position.
Figure 17:
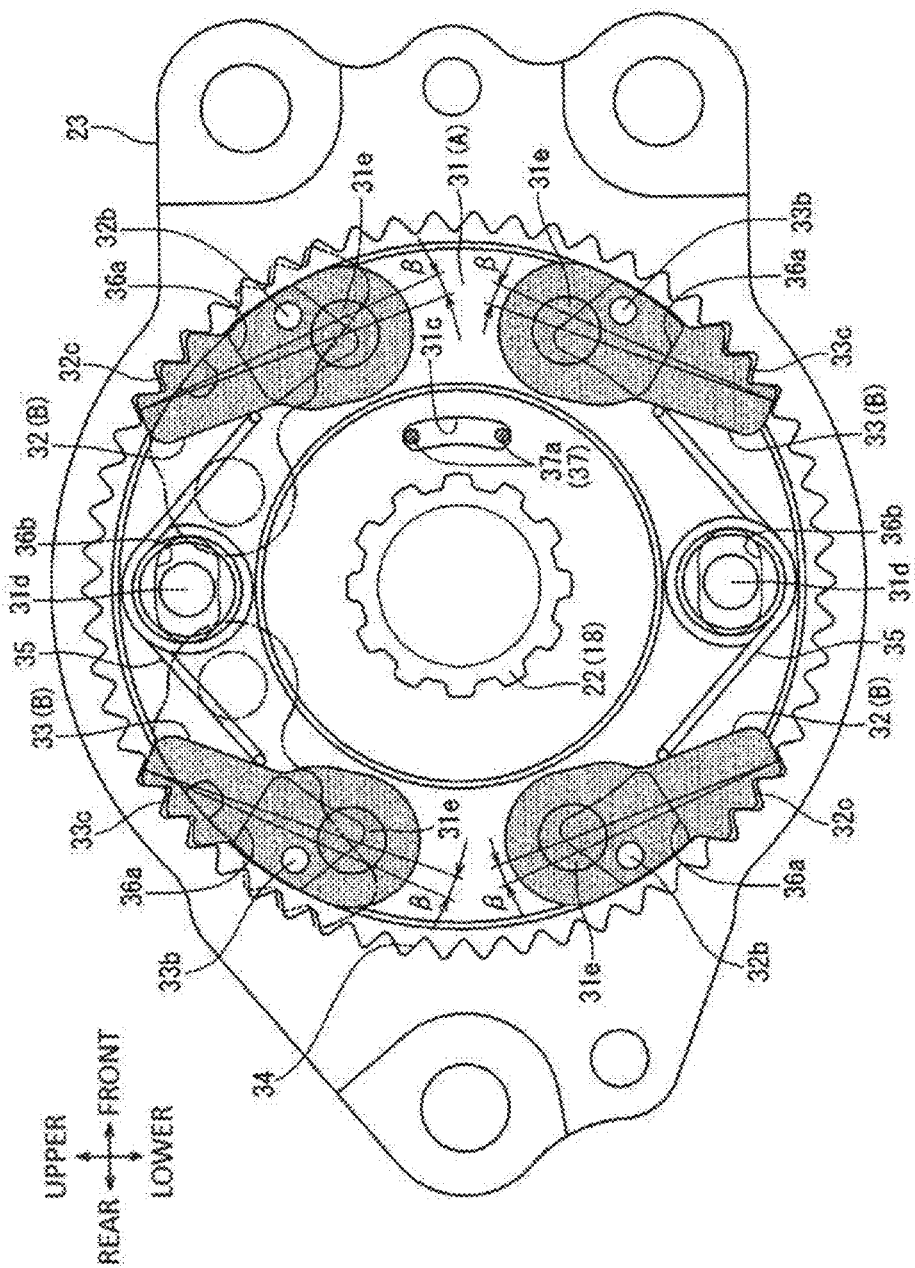
FIG. 17 illustrates a state of a lock unit when the operation handle is in the neutral position.

FIGS. 16 and 17 illustrate a state of the neutral position in which the operation handle 20 is not operated and the outer plate 41 and the inner plate 53 are not rotated. At this time, as illustrated in FIG. 16, the engagement end portions 52*a* forming the outer teeth of the feed claws 52 are engaged with the inner teeth 51 of the rotation transmission plate 36 by the biasing of the torsion spring 55. Further, as illustrated in FIG. 17, the respective engagement end portions 32*c*, 33*c* of the pawls 32, 33 are engaged with the inner teeth 34 of the support member 23 by the biasing force of the torsion springs 35. Therefore, the rotation of the lock plate 31 is locked by the engagement of the pawls 32, 33, and the height of the seat 1 is not changed to a lifting side or a lowering side.

<Operation of Rotation Control Device 21 (Operation Handle 20 Pushed Down)>

Figure 18:
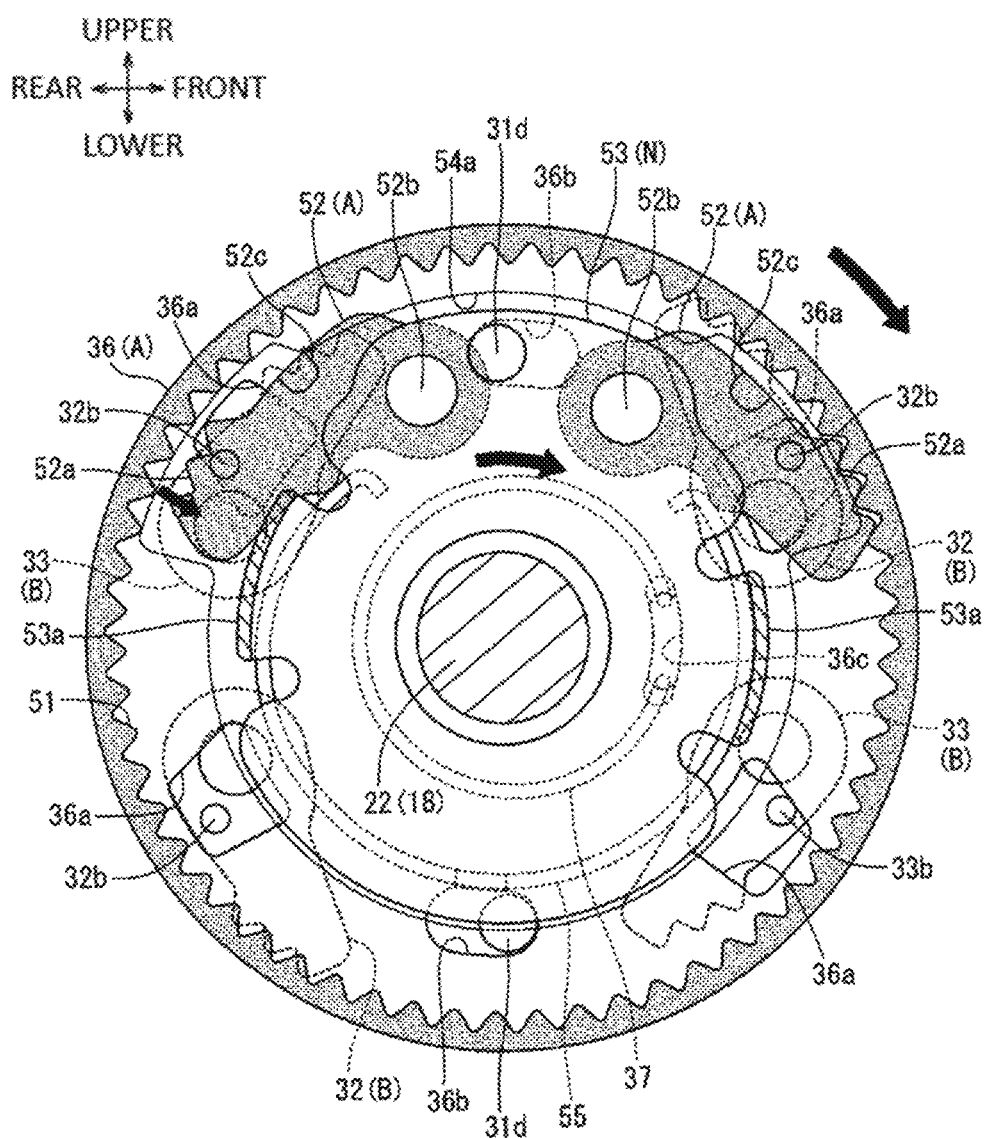
FIG. 18 illustrates a state of the feed unit when the operation handle is pushed down from the neutral position to an intermediate position.
Figure 19:
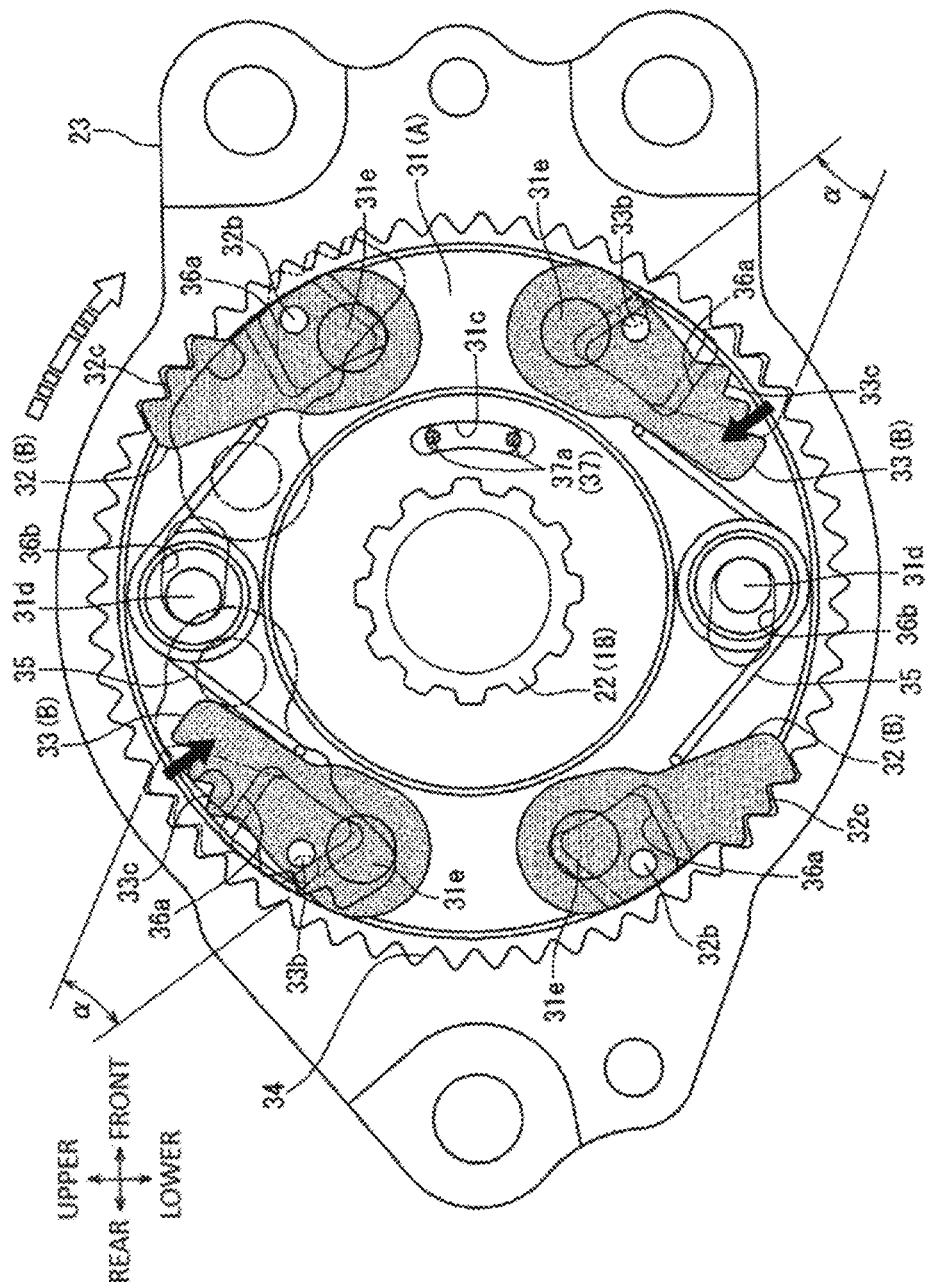
FIG. 19 illustrates a state of the lock unit when the operation handle is pushed down from the neutral position to the intermediate position.

FIGS. 18 and 19 illustrate a state in which the operation handle 20 is pushed down from the neutral position to an intermediate position. At this time, as illustrated in FIG. 18, the inner plate 53 is rotated in an arrow direction by the rotation of the outer plate 41. As a result, the feed claws 52 are moved in the same direction. Therefore, the engagement end portion 52*a* forming the outer teeth of the front feed claw 52 transmits a force to the inner teeth 51 of the rotation transmission plate 36 to push and rotate the rotation transmission plate 36 in the arrow direction. At this time, the engagement end portion 52*a* forming the outer teeth of the rear feed claw 52 does not mesh with the inner teeth 51 of the rotation transmission plate 36. That is, in this state, teeth of the engagement end portion 52*a* receive a load in a normal direction of teeth of the inner teeth 51 and move in a mesh release direction. With the rotation of the rotation transmission plate 36, a pin 52*c* of the rear feed claw 52 rides on the cam protrusion 54*a* of the cam member 54, and the engagement end portion 52*a* is separated from the inner teeth 51.

When the rotation transmission plate 36 is rotated in this manner, as illustrated in FIG. 19, the corresponding engagement holes 36*a* of the rotation transmission plate 36 are engaged with the pins 33*b* of the pawls 33, and the engagement end portions 33*c* of the pawls 33 are rotated to be pushed radially inward to be disengaged from the inner teeth 34 of the support member 23. As a result, a locked state of the lock plate 31 in the lowering direction is released. Thereafter, when the protrusions 31*d* of the lock plate 31 are engaged with the engagement holes 36*b*, the rotation of the rotation transmission plate 36 can be transmitted to the lock plate 31. In FIG. 19, a white two-dot chain line arrow represents the rotation of the rotation transmission plate 36 (not illustrated).

Specifically, the four engagement holes 36*a* formed in the rotation transmission plate 36 have a substantially trapezoidal shape of which circumferential hole width narrows from a radially inner side toward a radially outer side. As illustrated in FIGS. 16 and 17, when the rotation transmission plate 36 is in the neutral position relative to the lock plate 31 by the biasing action of the torsion spring 37, the four engagement holes 36*a* are located as follows relative to the pins 32*b*, 33*b* (round pins) of the pawls 32, 33. That is, the two engagement holes 36*a* into which the pins 32*b* of the pawls 32 are inserted are in a circumferentially biased state in which inclined side surfaces of the engagement holes 36*a* facing the circumferential direction are close to the pins 32*b* in a clockwise direction. The two engagement holes 36*a* into which the pins 33*b* of the pawls 33 are inserted are in a circumferentially biased state in which inclined side surfaces of the engagement holes 36*a* facing the circumferential direction are close to the pins 33*b* in a counterclockwise direction.

With such a configuration, when the rotation transmission plate 36 is rotated from the neutral position described above to the situation illustrated in FIGS. 18 and 19, the inclined side surfaces of the engagement holes 36*a* into which the pins 33*b* of the pawls 33 are inserted are abutted against the two pins 33*b*, the pins 33*b* are pushed and slipped radially inward along the inclined side surfaces of the engagement holes 36*a* as the rotation advances, the engagement end portions 32*c* of the other two pawls 32 are maintained to be meshed with the inner teeth 34 of the support member 23, and the engagement end portions 33*c* of the pawls 33 are rotated to be disengaged from the inner teeth 34 of the support member 23.

Figure 26:
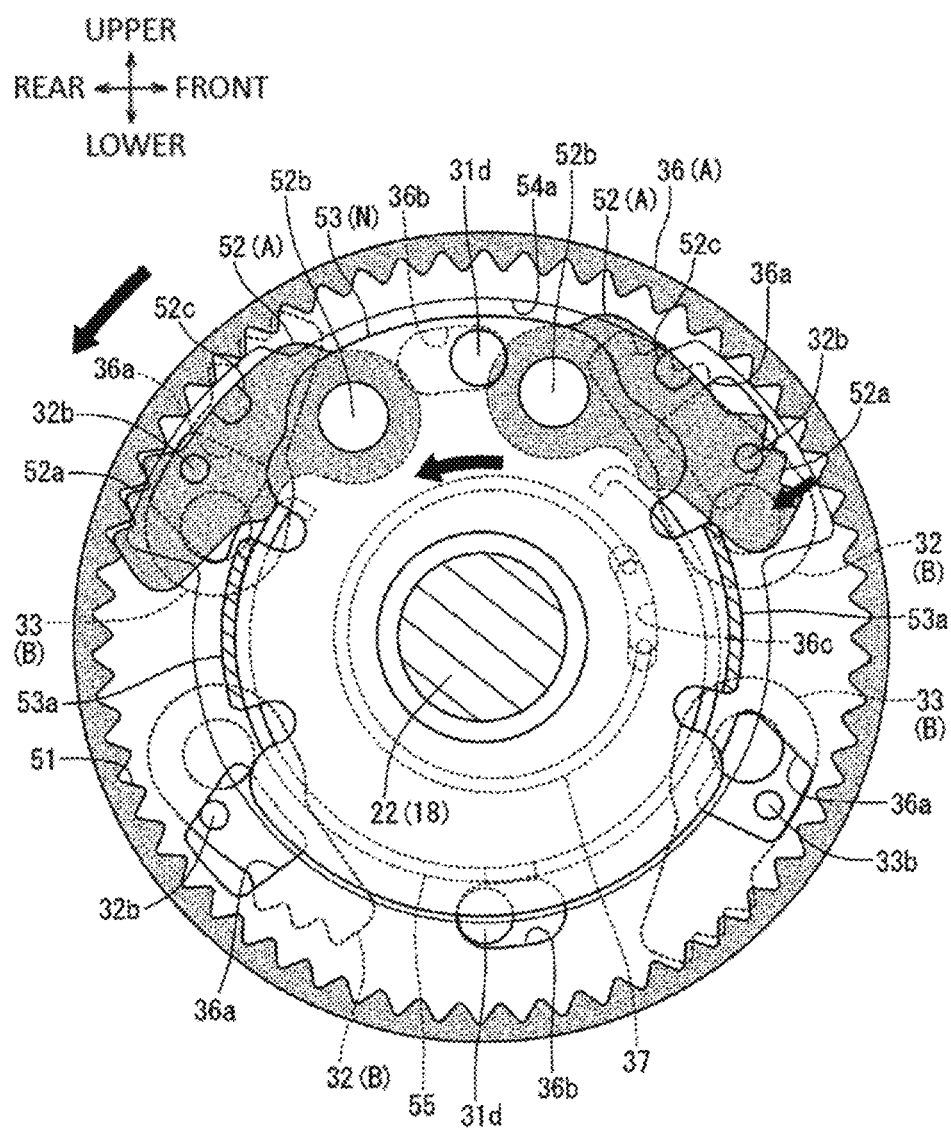
FIG. 26 illustrates a state of the feed unit when the operation handle is pulled up from the neutral position to the intermediate position.
Figure 27:
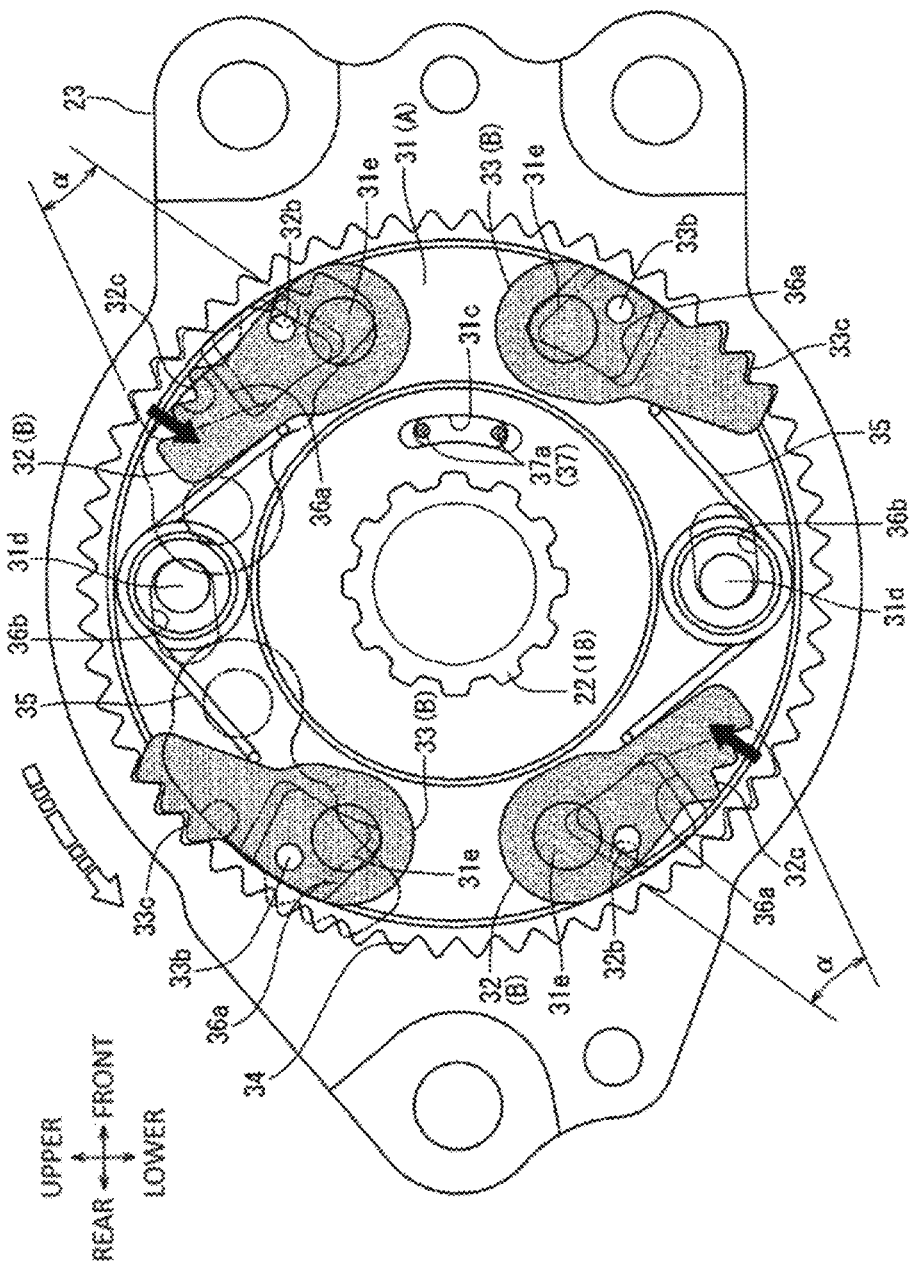
FIG. 27 illustrates a state of the lock unit when the operation handle is pulled up from the neutral position to the intermediate position.

Similarly, when the rotation transmission plate 36 is rotated from the neutral position described above to the situation (opposite direction) illustrated in FIGS. 26 and 27, the inclined side surfaces of the engagement holes 36*a* into which the pins 32*b* of the pawls 32 are inserted are abutted against the two pins 32*b*, the pins 32*b* are pushed and slipped radially inward along the inclined side surfaces of the engagement holes 36a as the rotation advances, the engagement end portions 33c of the other two pawls 33 are maintained to be meshed with the inner teeth 34 of the support member 23, and the engagement end portions 32c of the pawls 32 are rotated to be disengaged from the inner teeth 34 of the support member 23.

When the engagement end portions 32c, 33c of the pawls 32, 33 are engaged with the inner teeth 34 of the support member 23 as illustrated in FIG. 17, the pins 32b, 33b are located at radially intermediate positions between the protrusions 31e serving as rotation centers of the pawls 32, 33 relative to the lock plate 31 and tooth tips of the inner teeth 34. Therefore, the pawls 32, 33 can be efficiently rotated radially inward corresponding to a rotational movement amount of the rotation transmission plate 36 to be disengaged from the meshing with the inner teeth 34 of the support member 23 (see FIGS. 19 and 27). Therefore, it is possible to shorten a stroke required for a lock release operation of the pawls 32, 33 with the operation of the operation handle 20.

As illustrated in FIGS. 19 and 27, the inclined side surfaces of the engagement holes 36a of the rotation transmission plate 36 that push and rotate the pins 32b, 33b of the pawls 32, 33 in the rotation direction have such an inclined shape that an angle α defined by (i) the inclined side surface that comes into contact with the pins 32b, 33b (in a locked state indicated by imaginary lines) and (ii) a contact surface between a tooth surface of the engagement end portions 32c, 33c forming the outer teeth of the pawls 32, 33 which is farthest from the rotation centers (protrusions 31e) and a tooth surface of the inner teeth 34 is larger than a friction angle defined by the tooth surfaces. The setting of the angle α may also be applied to a tooth surface, other than the tooth surface farthest from the rotation center (protrusion 31e), of the engagement end portions 32c, 33c forming the outer teeth of the pawls 32, 33. Further, as illustrated in FIG. 17, the engagement end portions 32c, 33c forming the outer teeth of the pawls 32, 33 have such a tooth surface shape that an angle β defined by (i) a normal line of a contact surface between the tooth surfaces of the inner teeth 34 of the support member 23 and tooth surfaces of the engagement end portions 32c, 33c and (ii) a line obtained by connecting the contact point and the rotation center (protrusion 31e) of the pawls 32, 33 is smaller than the friction angle defined between tooth surfaces. As a result, the engagement end portions 32c, 33c of the pawls 32, 33 can be smoothly disengaged about the protrusions 31e from the inner teeth 34 of the support member 23 by the force of the rotation transmission plate 36 pressing the pawls 32, 33 in the rotation direction (see FIGS. 19 and 27).

<Operation of Rotation Control Device 21 (Operation Handle 20 at Full Stroke)>

Figure 20:
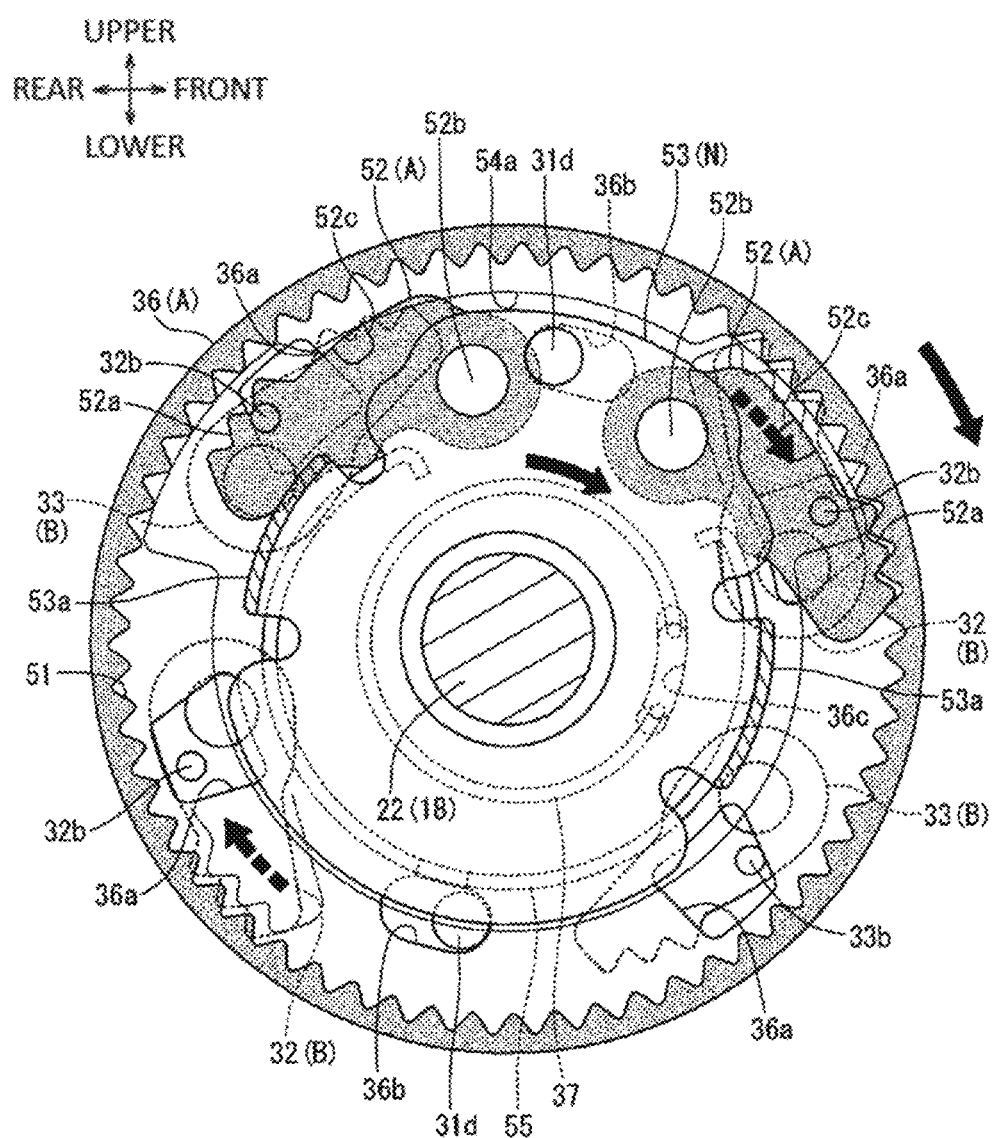
FIG. 20 illustrates a state of the feed unit when the operation handle is pushed down from the neutral position to a full stroke position.
Figure 21:
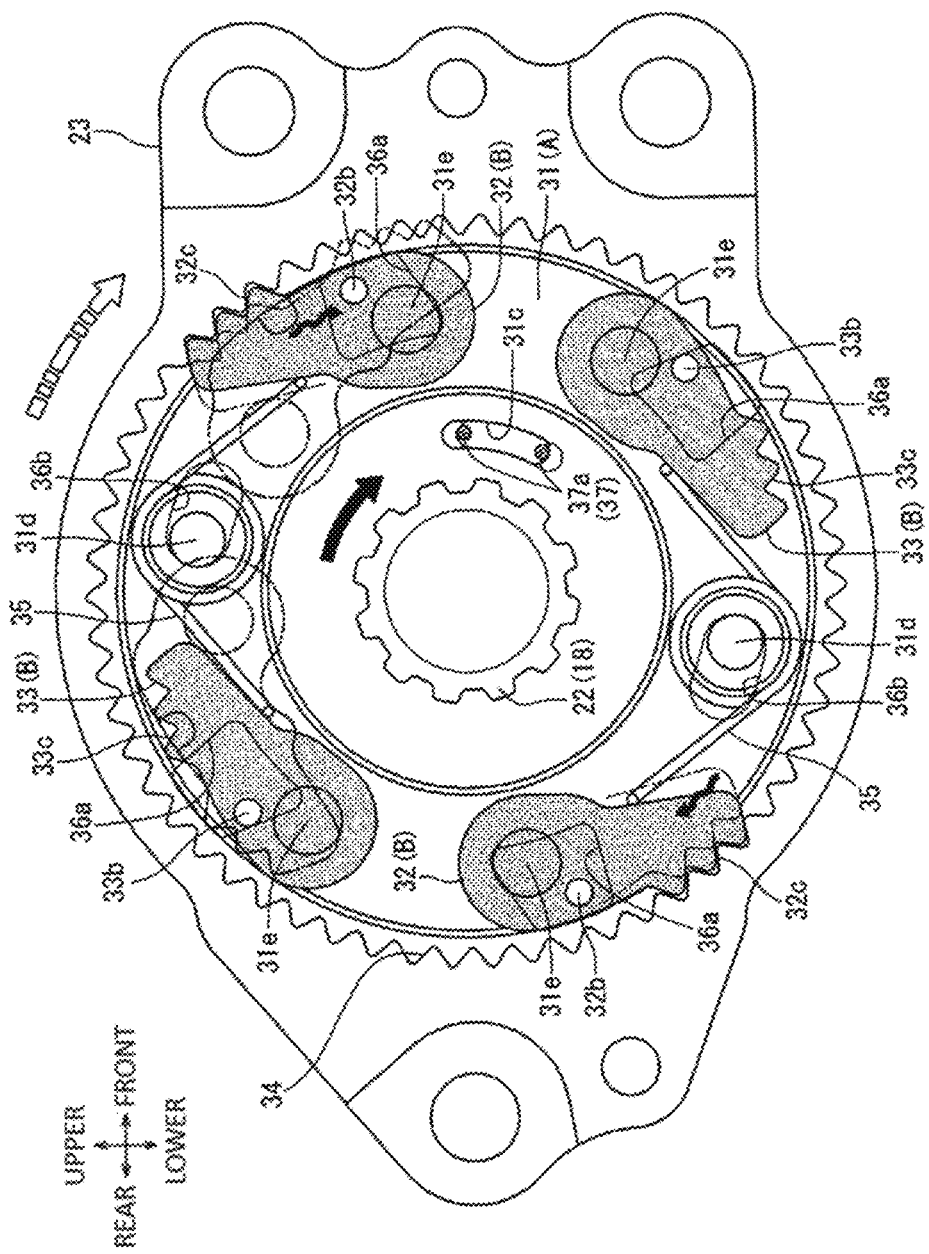
FIG. 21 illustrates a state of the lock unit when the operation handle is pushed down from the neutral position to the full stroke position.

FIGS. 20 and 21 illustrate a state in which the operation handle 20 is pushed down from the neutral position to a full stroke position. The full stroke position is determined when the arm 53a of the inner plate 53 abuts against circumferential end portion of the opening 24a of the cover 24. At this time, as illustrated in FIG. 20, the rotation of the inner plate 53 and the feed claws 52 advances as compared with the state of FIG. 18, and a rotation angle of the rotation transmission plate 36 is increased by the front feed claw 52.

When the rotation angle of the rotation transmission plate 36 is increased as described above, the rotation of the rotation transmission plate 36 is transmitted to the lock plate 31 to rotate the lock plate 31, and the rotation shaft 22 is rotated as indicated by a large black arrow as illustrated in FIG. 21. As a result, the pinion gear 18 is rotated, and the seat cushion 2 is lowered. At this time, the engagement end portions 32c of the pawls 32 are not meshed with the inner teeth 34 of the support member 23. That is, in this state, the teeth of the engagement end portions 32c receive a load in a normal direction of the teeth of the inner teeth 34 and are moved in a lock release direction. Therefore, when the lock plate 31 rotates, the engagement end portions 32c of the pawls 32 slide over the inner teeth 34 of the support member 23. A movement of the pawls 32 at this time is indicated by a solid line and an imaginary line. The movement is also indicated by a wave arrow <Operation of Rotation Control Device 21 (Influence of Gravity of Seat 1)>

Figure 22:
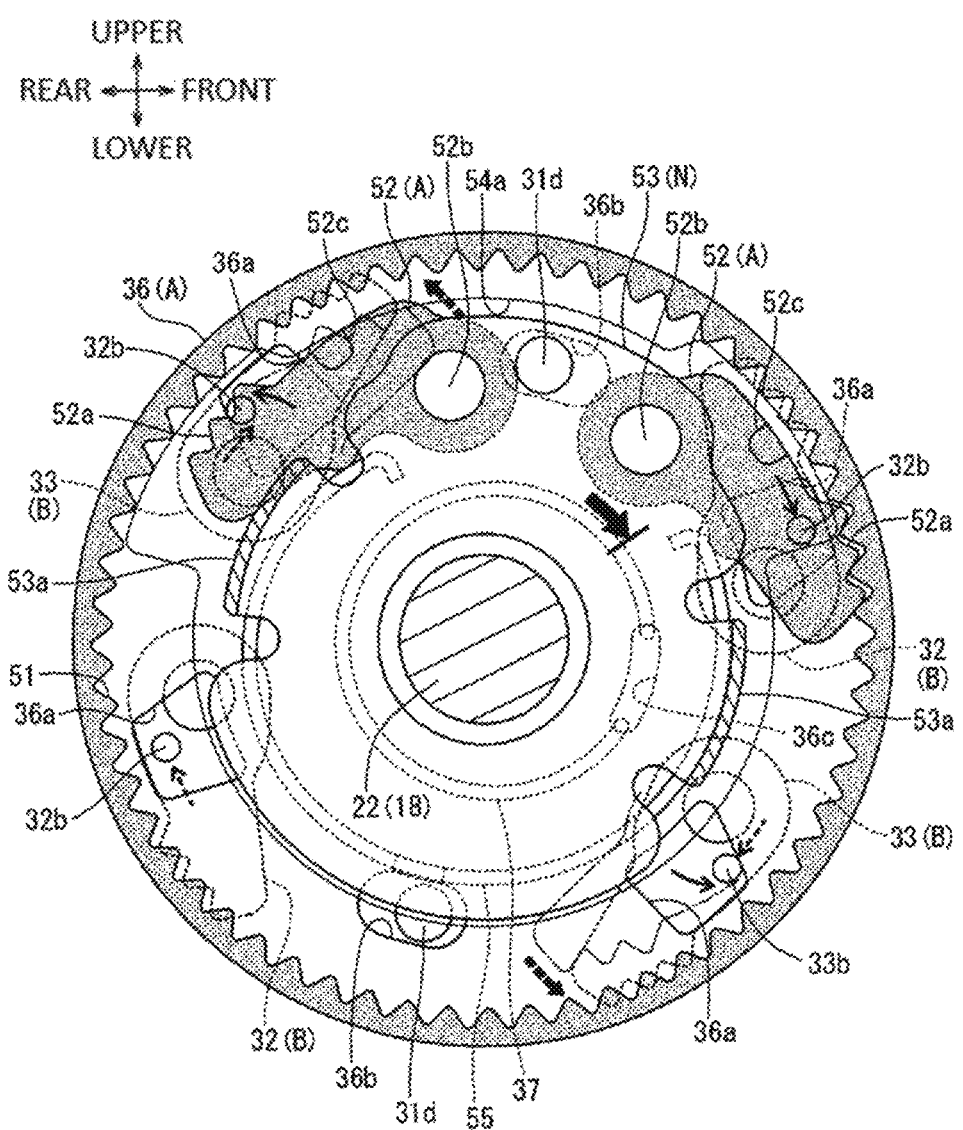
FIG. 22 illustrates a state of the feed unit when a pinion gear is rotated by a gravity effect received from a seat side from a push-down operation state of the operation handle.
Figure 23:
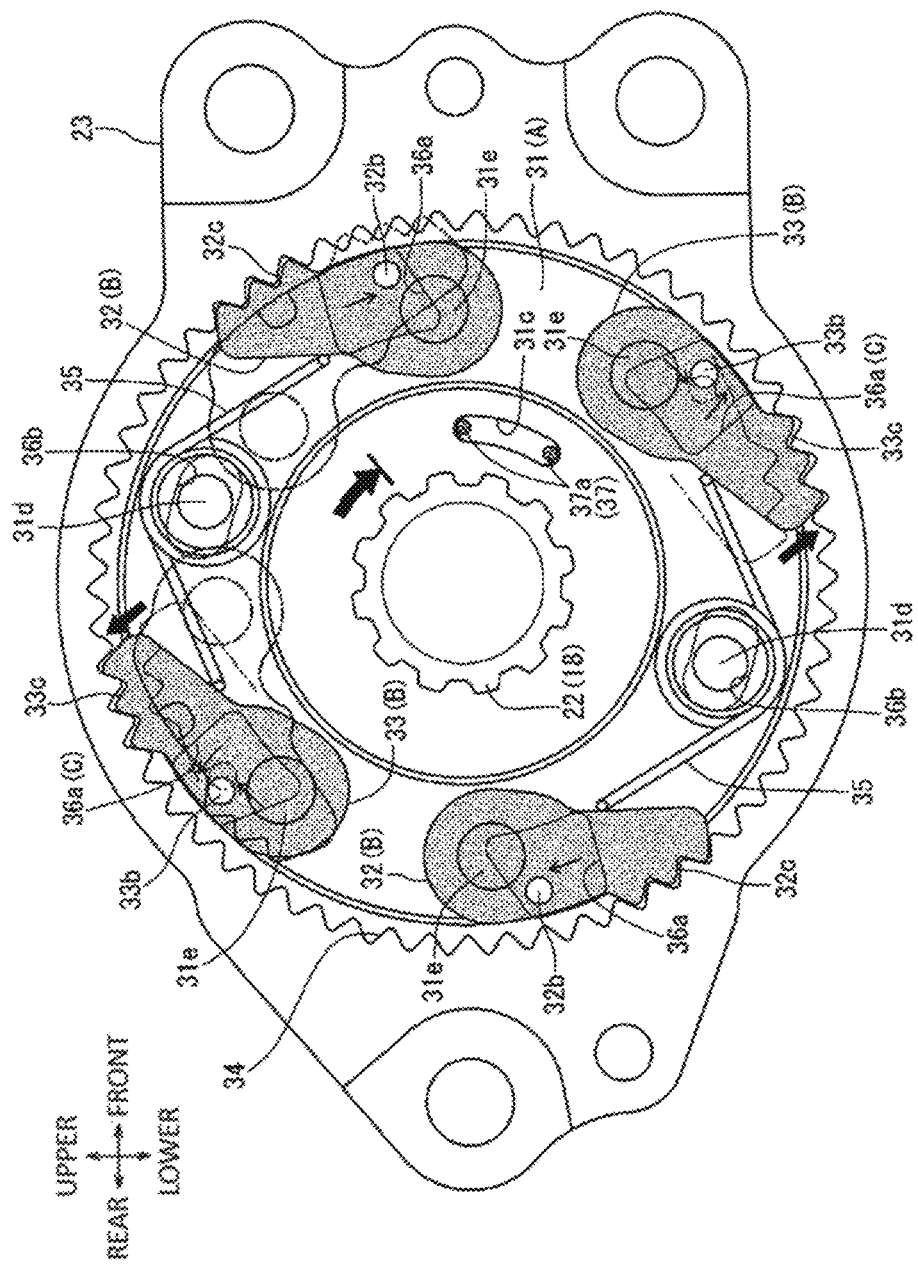
FIG. 23 illustrates a state of the lock unit when the pinion gear is rotated by the gravity effect received from the seat side from the push-down operation state of the operation handle.

FIGS. 22 and 23 illustrate a state in which rotation of the pinion gear 18 in the seat lowering direction due to gravity applied to the seat cushion 2 exceeds the rotation of the pinion gear 18 in the seat lowering direction due to the push-down operation of the operation handle 20. That is, FIGS. 22 and 23 illustrate a state in which the rotational movement amount of the pinion gear 18 is larger than the push-down operation amount of the operation handle 20. At this time, since the rotation transmission plate 36 continues rotating due to the feed claws 52, a state of the feed claws 52 illustrated in FIG. 22 is the same as the state in FIG. 20. On the other hand, the lock plate 31 is not rotated by the rotation transmission plate 36 but is rotated by the rotation shaft 22.

Therefore, as illustrated in FIG. 23, a swing state of the pawls 33 due to the engagement holes 36a is released, and the pawls 33 mesh with the inner teeth 34 of the support member 23 to lock the rotation of the lock plate 31 in the lowering direction. Therefore, the seat cushion 2 is prevented from lowering (slipping) due to the gravity applied thereto during the push-down operation of the operation handle 20. In this manner, the rotation transmission plate 36 includes: the engagement holes 36a that are rotated to positions where the engagement holes 36b are engaged with the lock plate 31 and that push the pawls 33 that stop rotation in that direction such that the pawls 33 are disengaged from the meshing with the inner teeth 34 of the support member 23; and a cancel structure C that cancels, when the feed rotation of the lock plate 31 via the rotation transmission plate 36 is stopped and a reverse input in a direction of further advancing the feed rotation is input from the pinion gear 18, the disengaged state of the pawls 33 that stop rotation in that direction, which is performed by the engagement holes 36a when the rotation of the lock plate 31 advances. In this state, an operation of the pawls 33 locking the rotation of the lock plate 31 in the lowering direction may be delayed and the seat cushion 2 may be lowered due to the gravity. Accordingly, in order to prevent the above, it is desirable to apply a brake to the rotation of the rotation shaft 22 to some extent to prevent the rotation of the rotation shaft 22 due to the gravity of the seat 1.

<Operation of Rotation Control Device 21 (Push-Down Operation of Operation Handle 20 Stopped)>

Figure 24:
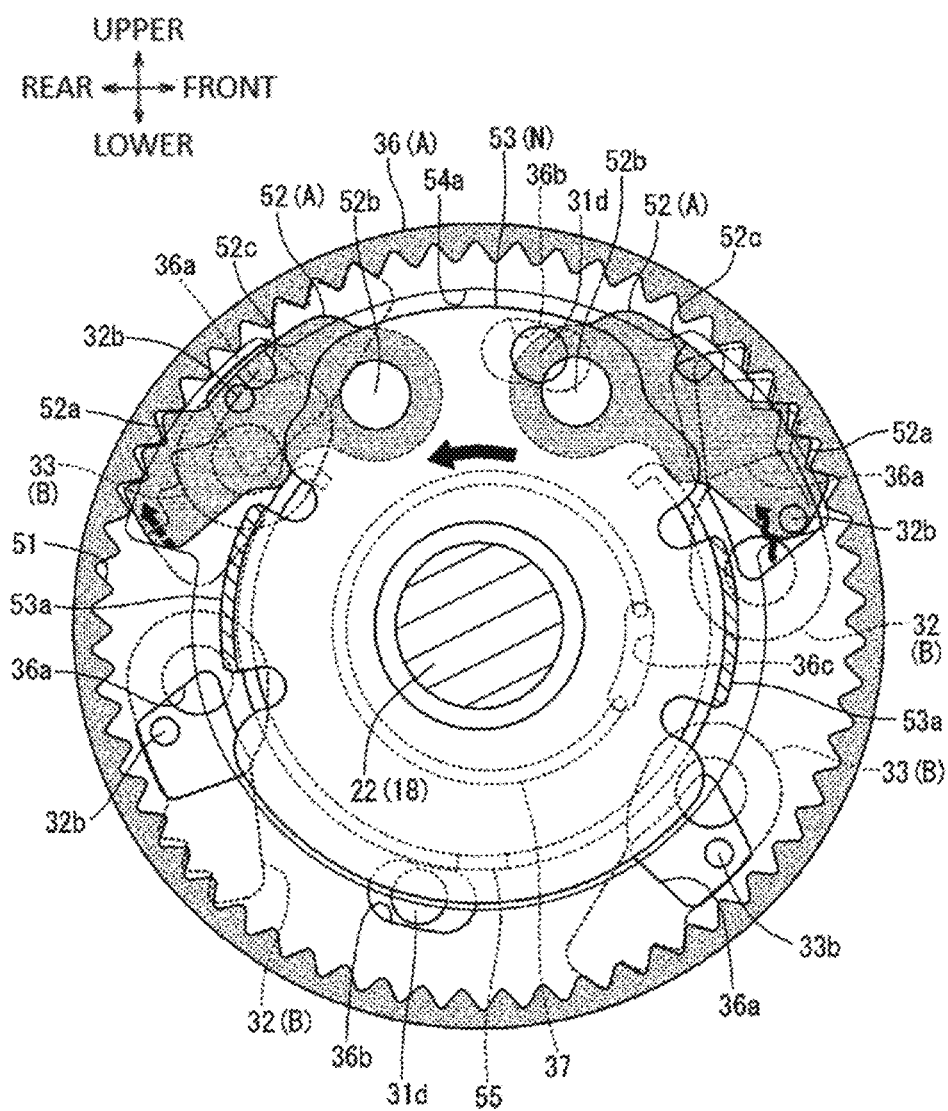
FIG. 24 illustrates a state of the feed unit when the operation handle is returned from the push-down operation state to the neutral position.
Figure 25:
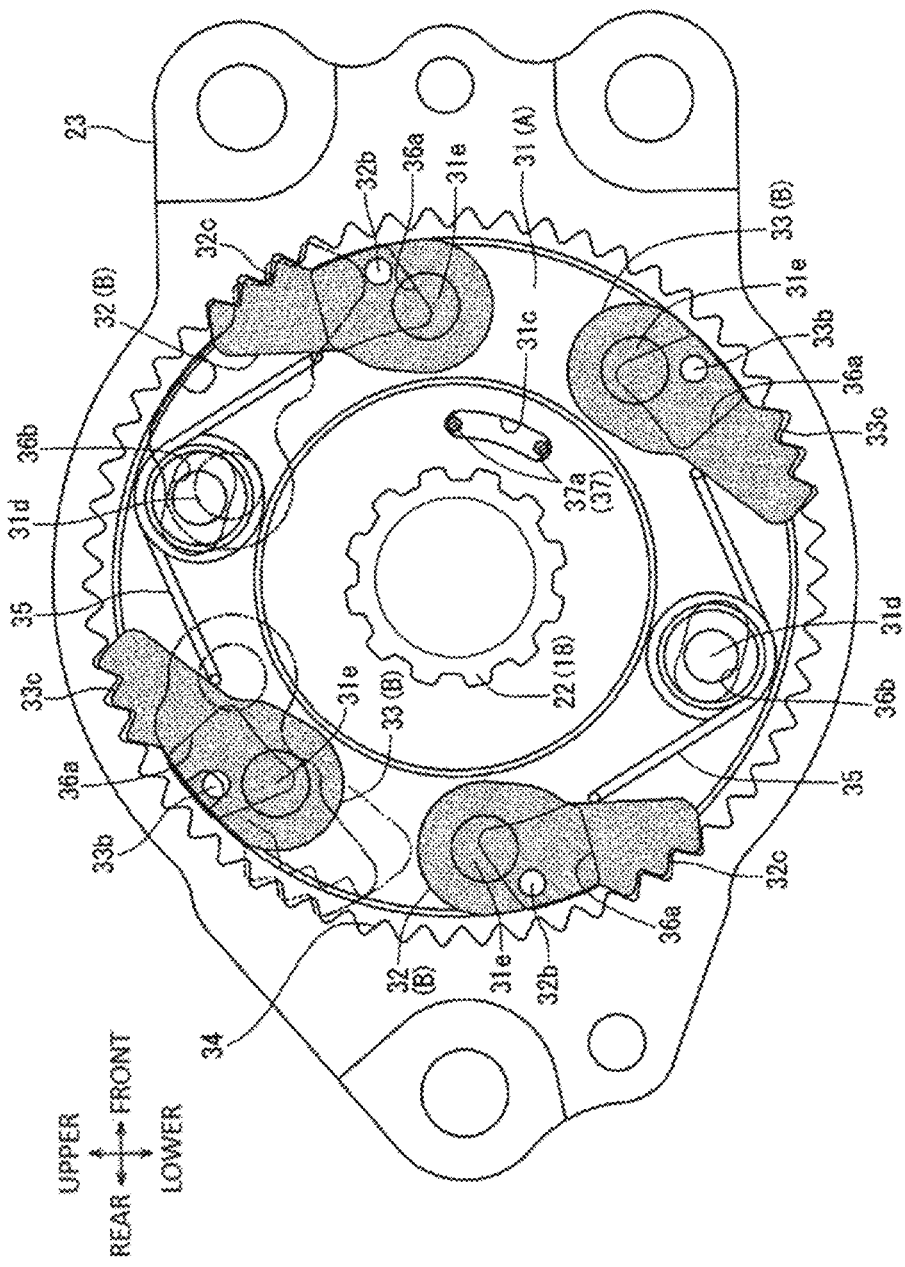
FIG. 25 illustrates a state of the lock unit when the operation handle is returned from the push-down operation state to the neutral position.

FIGS. 24 and 25 illustrate a state in which the push-down operation of the operation handle 20 is stopped and the operation handle 20 is returned to the neutral position. At this time, the outer plate 41 is returned to the neutral position by the biasing force of the torsion spring 43, and the inner plate 53 is also returned to the neutral position in synchronization. Therefore, the inner plate 53 is rotated as indicated by an arrow in FIG. 24. Until the inner plate 53 is returned to the neutral position, the rear feed claw 52 is brought into a state in which the pin 52c rides on the cam protrusion 54a of the cam member 54. However, when the inner plate 53 returns to the neutral position, as illustrated in FIG. 24, the engagement end portion 52a of the rear feed claw 52 returns to a state of meshing with the inner teeth 51 of the rotation transmission plate 36. On the other hand, until the inner plate 53 is returned to the neutral position, the engagement end portion 52a of the front feed claw 52 slides over the inner teeth 51 of the rotation transmission plate 36.

When the push-down operation of the operation handle 20 is stopped, as described above, the rotation drive by the feed claws 52 to the rotation transmission plate 36 is released. Accordingly, the rotation transmission plate 36 is returned to the neutral position relative to the lock plate 31 by the biasing force of the torsion spring 37. Therefore, as illustrated in FIG. 25, the engagement end portions 32c, 33c of all the pawls 32, 33 are meshed with the inner teeth 34 of the support member 23 so that the lock plate 31 is locked in that position. Therefore, the pinion gear 18 also stops rotating, and the height of the seat cushion 2 is maintained in that position <Operation of Rotation Control Device 21 (Pull-Up Operation of Operation Handle 20)>

FIGS. 26 and 27 illustrate a state in which the operation handle 20 is pulled up from the neutral position to the intermediate position. At this time, as illustrated in FIG. 26, the inner plate 53 is rotated in an arrow direction by the feed-rotation of the outer plate 41. As a result, the feed claws 52 are moved in the same direction. Therefore, the engagement end portion 52a of the rear feed claw 52 transmits a force to the inner teeth 51 of the rotation transmission plate 36 to rotate the rotation transmission plate 36 in the arrow direction. At this time, the engagement end portion 52a of the front feed claw 52 does not mesh with the inner teeth 51 of the rotation transmission plate 36. That is, in this state, the teeth of the engagement end portion 52a receive a load in a normal direction of the teeth of the inner teeth 51 and move in the lock release direction. With the rotation of the rotation transmission plate 36, the pin 52c of the front feed claw 52 rides on the cam protrusion 54a of the cam member 54, and the engagement end portion 52a of the front feed claw 52 is separated from the inner teeth 51.

When the rotation transmission plate 36 is rotated as described above, the engagement holes 36a of the rotation transmission plate 36 are engaged with the corresponding pins 32b of the pawls 32, and the engagement end portions 32c of the pawls 32 are separated from the inner teeth 34 of the support member 23, as illustrated in FIG. 27. That is, the locked state of the lock plate 31 in the lifting direction is released. Thereafter, when the protrusions 31d of the lock plate 31 are engaged with the engagement holes 36b, the rotation of the rotation transmission plate 36 is transmitted to the lock plate 31. Therefore, as indicated by an arrow in FIG. 27, the lock plate 31 rotates to rotate the rotation shaft 22. As a result, the pinion gear 18 is rotated and the seat 1 is lifted. At this time, the engagement end portions 33c of the pawls 33 are not meshed with the inner teeth 34 of the support member 23. That is, in this state, the teeth of the engagement end portion 33c receive a load in a normal direction of the teeth of the inner teeth 34 and move in the lock release direction. Therefore, when the lock plate 31 rotates, the engagement end portions 33c of the pawls 33 slide over the inner teeth 34 of the support member 23.

<Operation of Rotation Control Device 21 (Summary)>

As described above, when the operation handle 20 is pushed down, the seat 1 is lowered by an amount corresponding to this operation. By repeating the push-down operation, the seat 1 can be adjusted to a desired height. Conversely, when the operation handle 20 is pulled up, the seat 1 is similarly lifted by an amount corresponding to this operation. By repeating the pull-up operation, the seat 1 can be adjusted to a desired height. When the seat 1 reaches a lower limit position or an upper limit position due to the above operations, further rotation of the rotation shaft 22 is stopped as illustrated in FIG. 28 or 29.

In summary, the lifter device 10 according to the present embodiment has the following configuration. That is, a lifter device (10) includes: a pinion gear (18) configured to mesh with an input gear (16) of a link mechanism (12) that lifts and lowers a seat (1), a rotation control device (21) that couples the pinion gear (18) and an operation handle (20) to control rotation of the pinion gear (18), the operation handle (20) being configured to be operated in a corresponding rotation direction when the seat is lifted and lowered, and a base (23) that supports the pinion gear (18) such that the pinion gear (18) is rotatable.

The rotation control device (21) includes an input member (N) coupled to the operation handle (20) and configured to be rotated about a rotation axis of the pinion gear (18) by a rotation operation of the operation handle (20); a feed unit (A) coupled to the input member (N) and the pinion gear (18) and configured to transmit rotation of the input member (N) to the pinion gear (18) as feed rotation; a lock unit (B) configured to stop rotation of the pinion gear (18) feed-rotated by the feed unit (A) relative to the base (23); and a release member (36) configured to be rotated about rotation axis of the pinion gear (18) by the rotation input from the input member (N) to release the lock unit (B).

The lock unit (B) includes a lock pawl (32, 33) attached to a rotation member (31) integrally coupled to the pinion gear (18) in the rotation direction, the lock pawl (32, 33) being configured to be meshed in a biased state with a base gear (34) of the base (23) that has inner teeth to stop the rotation of the pinion gear (18). The lock pawl (32, 33) includes a shaft portion (31e) rotatably supported on the rotation member (31) about an axis parallel to the rotation axis of the pinion gear (18); outer teeth (32c, 33c) configured to be meshed with the base gear (34), and a pressed portion (32b, 33b) provided at an intermediate position in a radial direction between a shaft center of the shaft portion (31e) and a tooth tip of the inner teeth of the base gear (34), the pressed portion being configured to be pressed in the rotation direction by the release member (36) to be released.

With such a configuration, when the meshing between the lock pawl (32, 33) and the base gear (34) (that is, the lock of the lifter device (10)) is released, the release member (36) presses the pressed portion (32b, 33b) provided on the lock pawl (32, 33) in the rotation direction. Accordingly, the lock pawl (32, 33) rotates about the shaft portion (31e) and is displaced away from the base gear (34), so that the meshing of the lock pawl (32, 33) and the base gear (34) is released. Here, the pressed portion (32b, 33b) of the lock pawl (32, 33) is provided at a predetermined position (intermediate position) in the radial direction between the shaft center of the shaft portion (31e) and the tooth tip of the inner teeth of the base gear (34). Therefore, the lock pawl (32, 33) can be efficiently displaced in response to a rotational movement amount of the release member (36) compared with a case where the pressed portion (32b, 33b) of the lock pawl (32, 33) is located at other positions, so that the meshing of the lock pawl (32, 33) and the base gear (34) can be more easily released. Therefore, the lifter device (10) can shorten a stroke required for the unlocking operation with the operation of the operation handle (20). Further, with the configuration in which the release member (36) presses the pressed portion (32b, 33b) protruding in a thrust direction from the lock pawl (32, 33) in the rotation direction, the release member (36) can overlap the lock pawl (32, 33) in the rotation direction, and a degree of freedom in component arrangements can be increased.

An angle (α) defined by a first contact surface that is provided on the release member (36) and that comes into contact with the pressed portion (32b, 33b) of the lock pawl (32, 33) and a second contact surface of an outer surface of the outer teeth (32c, 33c) of the lock pawl (32, 33) that comes into contact with the inner teeth of the base gear (34) is larger than a friction angle defined by the second contact surface and a tooth surface of the inner teeth of the base gear. With such a configuration, a force in a direction in which the lock pawl (32, 33) is separated from the base gear (34) can be sufficiently increased relative to the frictional force generated between the outer teeth (second contact surface) of the lock pawl (32, 33) and the inner teeth of the base gear (34). Therefore, the outer teeth (32c, 33c) of the lock pawl (32, 33) can be smoothly disengaged from the inner teeth of the base gear (34) about the shaft portion (31e).

An angle (β) defined by a normal line of the second contact surface of the outer surface of the outer teeth (32c, 33c) of the lock pawl (32, 33) that comes into contact with the inner teeth of the base gear (32, 33) and a line obtained by connecting a contact point between the second contact surface and the tooth surface of the inner teeth and the shaft center of the shaft portion of the lock pawl (32, 33) is smaller than the friction angle defined by the second contact surface and the tooth surface of the inner teeth. With such a configuration, similarly to the angle (α), the force in a direction in which the lock pawl (32, 33) is separated from the base gear (34) can be sufficiently increased relative to the frictional force generated between the outer teeth (second contact surface) of the lock pawl and the inner teeth of the base gear (34). Therefore, the outer teeth (32c, 33c) of the lock pawl (32, 33) can be smoothly disengaged from the inner teeth of the base gear (34) about the shaft portion (31e) by a force of the release member (36) pressing the lock pawl (32, 33) in the rotation direction.

Second Embodiment

<Schematic Configuration of Lifter Device 10>

Next, a configuration of the lifter device 10 applied to the seat 1 according to a second embodiment will be described with reference to FIGS. 30 to 34. In the present embodiment, when the rotation transmission plate 36 is feed-rotated, the pawls 32, 33 attached to the lock plate 31 are pressed in a circumferential direction by protrusions 36e protruding leftward in an arc shape from two locations of the rotation transmission plate 36 in the circumferential direction. Accordingly, the pawls 32, 33 are disengaged from a meshing state with the inner teeth 34 of the support member 23.

Figure 32:
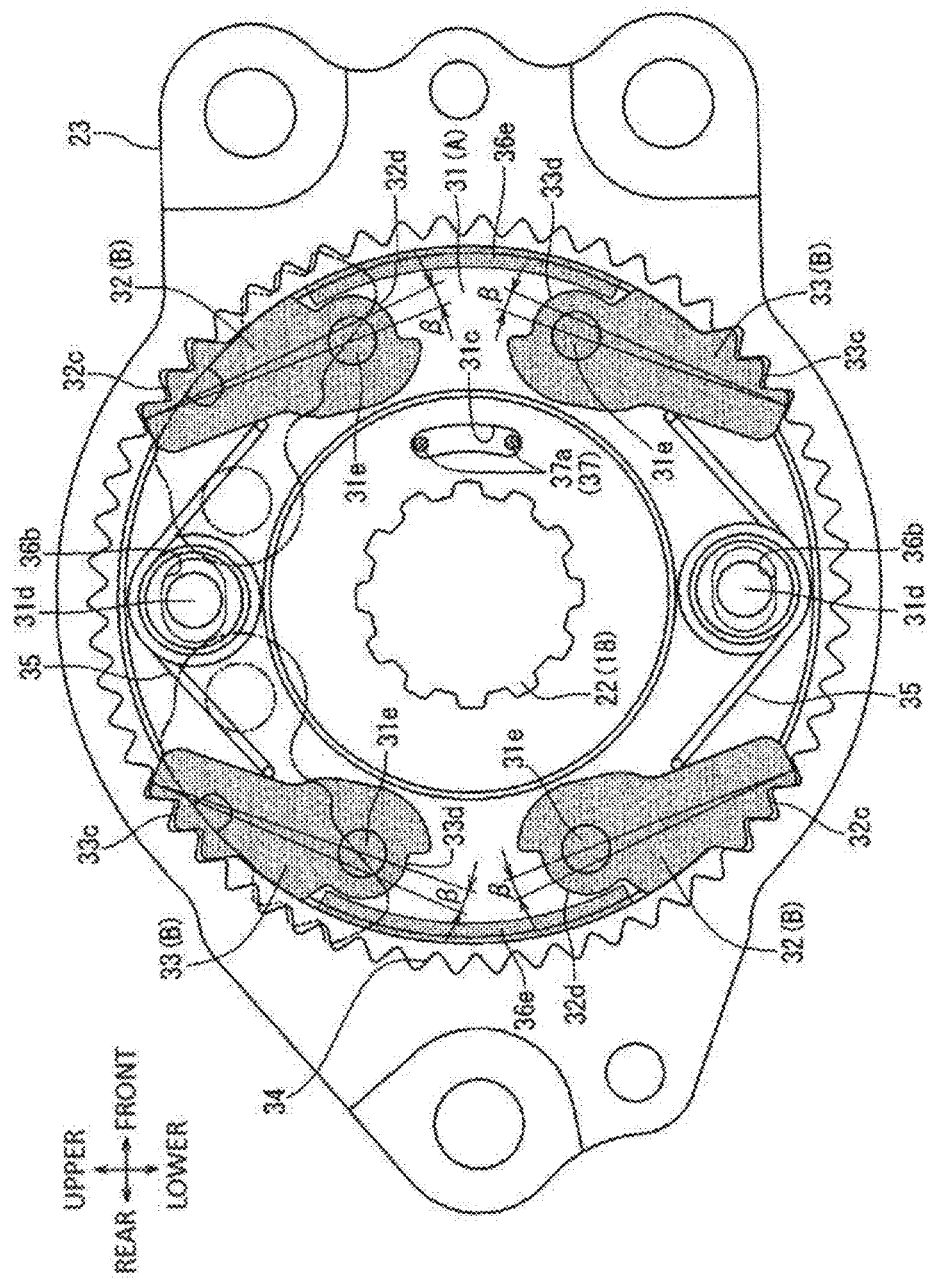
FIG. 32 illustrates a state of a lock unit of the rotation control device when the operation handle is in the neutral position.
Figure 33:
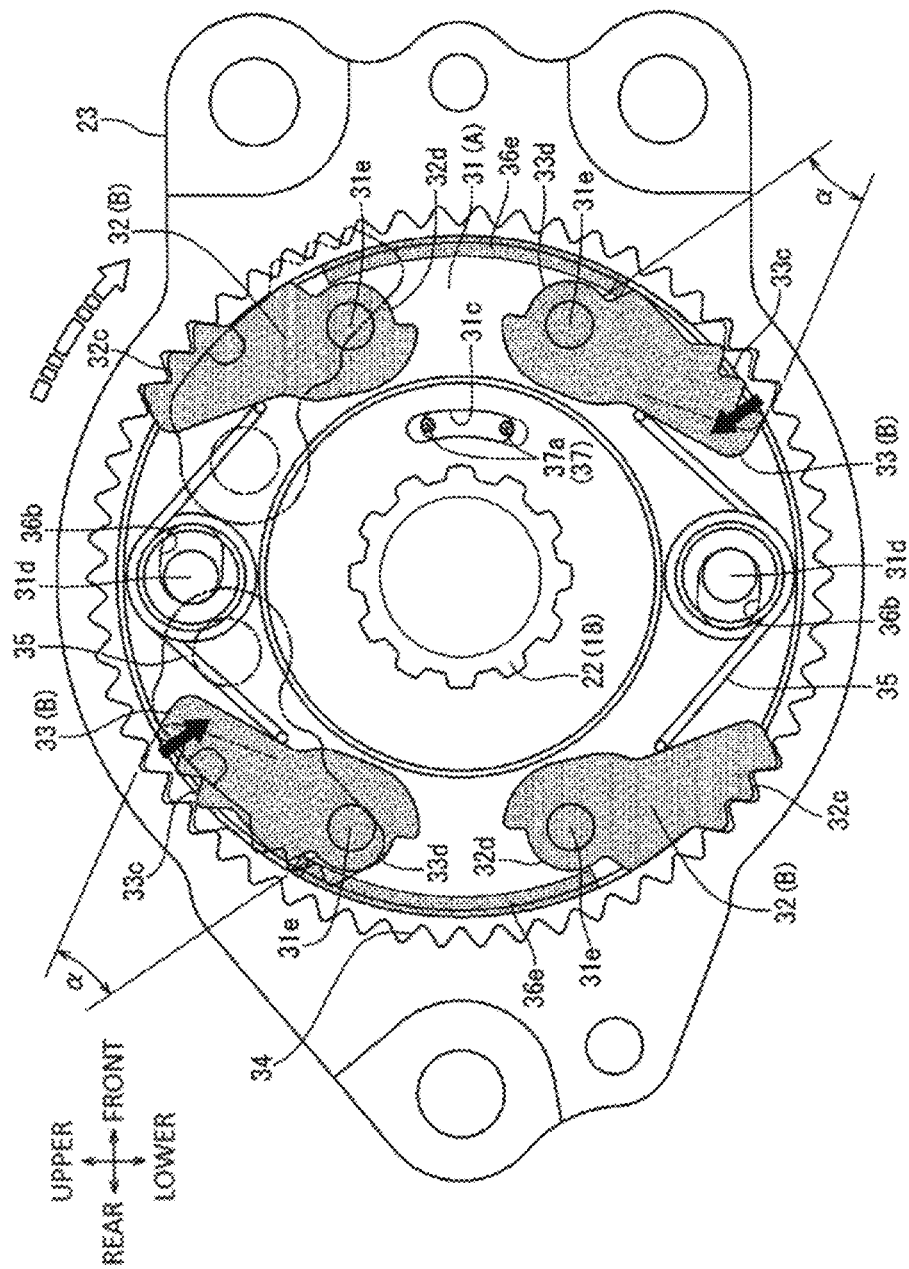
FIG. 33 illustrates a state of the lock unit when the operation handle is pushed down from the neutral position to the intermediate position.
Figure 34:
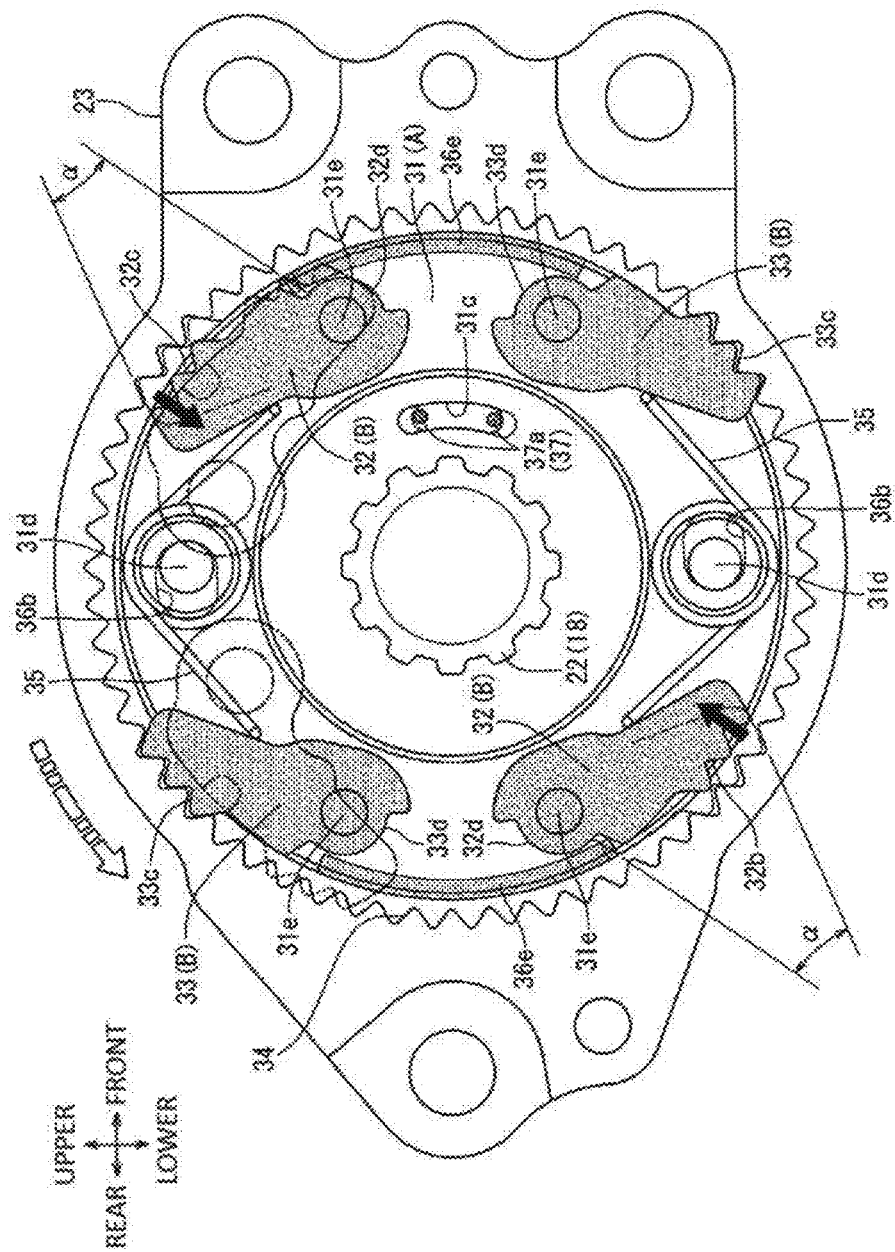
FIG. 34 illustrates a state of the lock unit when the operation handle is pulled up from the neutral position to the intermediate position.

Specifically, the pressing protrusions 36e are formed by embossing the two locations of the rotation transmission plate 36 in the circumferential direction in shapes of circular arcs of the same circle drawn about a center of the rotation transmission plate 36. As illustrated in FIGS. 32 to 34, concave portions 32d, 33d (corresponding to "pressed portion" of the present invention) are formed on radially outer side surfaces of the pawls 32, 33 relative to the protrusions 31e serving as the rotation centers, and are pressed in the circumferential direction by the pressing projections 36e with rotation of the rotation transmission plate 36 in forward and reverse directions, so that the pawls 32, 33 that receive a pressing force from the pressing protrusions 36e are disengaged from the meshing state with the inner teeth 34 of the support member 23.

When the engagement end portions 32c, 33c of the pawls 32, 33 are engaged with the inner teeth 34 of the support member 23 as illustrated in FIG. 32, the concave portions 32d, 33d are located at radially intermediate positions between the protrusions 31e serving as rotation centers of the pawls 32, 33 relative to the lock plate 31 and tooth tips of the inner teeth 34. Therefore, as in the first embodiment described above, the pawls 32, 33 can be efficiently rotated radially inward corresponding to a rotational movement amount of the rotation transmission plate 36 to be disengaged from the meshing with the inner teeth 34 of the support member 23 (see FIGS. 33 and 34). Therefore, it is possible to shorten a stroke required for an unlocking operation of the pawls 32, 33 with the operation of the operation handle 20.

As illustrated in FIGS. 33 and 34, the concave portions 32d, 33d of the pawls 32, 33 have such an inclined shape that the angle α defined by a contact surface pressed by the pressing protrusions 36e and a tooth surface of the engagement end portions 32c, 33c forming the outer teeth of the pawls 32, 33 that is farthest from the rotation centers (protrusions 31e) and that comes into contact with tooth surfaces of the inner teeth 34 is larger than a friction angle defined by the tooth surfaces. As a result, the engagement end portions 32c, 33c of the pawls 32, 33 can be smoothly disengaged about the protrusions 31e from the inner teeth 34 of the support member 23 by the force of the rotation transmission plate 36 pressing the pawls 32, 33 in the rotation direction.

The pawls 32, 33 are symmetrical with each other, and are common components having the same shape as each other. Configurations other than the above are the same as those in the first embodiment and are accordingly denoted by the same reference numerals and detailed descriptions thereof are omitted.

In summary, the lifter device 10 according to the present embodiment has the following configuration. That is, a plurality of lock pawls (32, 33) include a pair of ratchet meshing structures that function in directions symmetrical with each other, and the ratchet meshing structures are configured to function such that, when rotation in one direction is input to the rotation member (31), the lock pawls (32, 33) mesh with the base gear (34) to transmit power, and when rotation in the other direction is input to the rotation member (31), the lock pawls (32, 33) are released from meshing with the base gear (34) not to transmit power. The plurality of lock pawls (32, 33) each include the pressed portion (32d, 33d) on an outer circumferential surface of the lock pawls (32, 33) and have the same flat plate shape as each other. With such a configuration, the ratchet meshing structures can be constituted by the plurality of lock pawls (32, 33) having the same flat plate shape. Particularly, when the pressed portion (32d, 33d) is provided on the outer circumferential surface of the lock pawls (32, 33) (see FIG. 30), the number of types of lock pawls required for the meshing structures can be reduced as compared with, for example, a case where the pressed portion (32d, 33d) is provided as the protrusion (33b) protruding in a thrust direction from the lock pawls (32, 33) (see FIG. 9). Therefore, it is possible to prevent erroneous assembly of the lock pawls (32, 33) and to reduce the number of management components.

OTHER EMBODIMENTS

Although a specific embodiment has been described above, the present invention is not limited to those appearances and configurations, and modifications, additions and deletions can be made thereto. For example, the present invention is applied to a seat of a vehicle in the above embodiment, and may also be applied to a seat mounted on vehicles such as an airplane, a ship, and a train, or a seat installed in a movie theater or the like.

The present application is based on a Japanese patent application (No. 2018-086134) filed on Apr. 27, 2018, the contents of which are incorporated herein by reference.

INDUSTRIAL APPLICABILITY

According to the lifter device of the present invention, for example, it is possible to shorten a stroke required for an unlocking operation with the operation of the operation handle. The present invention having this effect is useful, for example, for a seat of a vehicle or the like.

REFERENCE SIGNS LIST 1 vehicle seat (seat)
2 seat cushion
3 seat back
4 floor
5 lower rail
6 upper rail
7 bracket
8 seat slide device
10 lifter device
11 link member
11a front link
11b rear link
12 link mechanism
13 side frame
13a through hole
14 base member
16 sector gear (input gear)
17 torque rod
18 pinion gear
20 operation handle
21 rotation control device
22 rotation shaft
22a outer circumferential surface
22b, 22c spline
23 support member (base)
23a through hole
23b guide concave portion
23c center hole
24 cover
24a opening
24b engagement piece
24c protruding piece
24d leg portion
24e through hole
25 shaft member
25a spline bole
25b protruding pin
25c flange portion
31 lock plate (rotation member)
31a slide surface portion
31b spline hole
31c elongated hole
31d protrusion
31e protrusion (shaft portion)
32, 33 pawl (lock pawl)
32a, 33a through hole
32b, 33b pin (pressed portion)
32c, 33c engagement end portion (outer teeth)
32d, 33d concave portion (pressed portion)
34 inner teeth (base gear)
35 torsion spring
35a winding portion
35b end portion
36 rotation transmission plate (release member)
36a engagement hole
36b engagement hole
36c elongated hole
36d center hole
36e pressing protrusion
37 torsion spring
37a end portion
41 outer plate
41a through hole
41b center hole
42 engagement piece
43 torsion spring
43a end portion
51 inner teeth
52 feed claw
52a engagement end portion
52b hinge portion
52c pin
52d projection
53 inner plate
53a arm
53b through hole
53c engagement hole
53d center hole
54 cam member
54a cam protrusion
54b pin
55 torsion spring
55a end portion
55b protrusion
60 stopper
61 support member-side projection
62 engagement piece
63 rotation shaft-side projection
α angle
β angle
C cancel structure
A feed unit
B lock unit
N input member
W welding portion

The invention claimed is:

1. A lifter device comprising:
a pinion gear configured to mesh with an input gear of a link mechanism that lifts and lowers a seat;
a rotation control device that couples the pinion gear and an operation handle to control rotation of the pinion gear, the operation handle being operated in a corresponding rotation direction when the seat is lifted and lowered; and
a base that supports the pinion gear such that the pinion gear is rotatable,
wherein the rotation control device includes:
an input member coupled to the operation handle and configured to be rotated about a rotation axis of the pinion gear by a rotation operation of the operation handle;
a feed unit coupled to the input member and the pinion gear and configured to transmit rotation of the input member to the pinion gear as feed rotation;

a lock unit configured to stop rotation of the pinion gear feed-rotated by the feed unit relative to the base; and
a release member configured to be rotated about the rotation axis of the pinion gear by rotation input from the input member to release the lock unit,
wherein the lock unit includes a lock pawl attached to a rotation member integrally coupled to the pinion gear in the rotation direction, the lock pawl being configured to be meshed in a biased state with a base gear of the base that has inner teeth to stop the rotation of the pinion gear,
wherein the lock pawl is rotatably supported on a shaft portion of the rotation member about an axis parallel to the rotation axis of the pinion gear, and
wherein the lock pawl includes:
  outer teeth configured to be meshed with the base gear; and
  a pressed portion provided at an intermediate position in a radial direction between a shaft center of the shaft portion and a tooth tip of the inner teeth of the base gear, the pressed portion being configured to be pressed in the rotation direction by the release member to be released.

2. The lifter device according to claim 1,
wherein an angle defined by a first contact surface that is provided on the release member and that comes into contact with the pressed portion of the lock pawl and a second contact surface of an outer surface of the outer teeth of the lock pawl that comes into contact with the inner teeth of the base gear is larger than a friction angle defined by the second contact surface and a tooth surface of the inner teeth of the base gear.

3. The lifter device according to claim 1,
wherein a plurality of the lock pawls include a pair of ratchet meshing structures that function in directions symmetrical with each other, the ratchet meshing structures being configured to function such that, when rotation in one direction is input to the rotation member, the lock pawls mesh with the base gear to transmit power, and when rotation in the other direction is input to the rotation member, the lock pawls are released from meshing with the base gear not to transmit power, and
wherein the plurality of the lock pawls each include the pressed portion on an outer circumferential surface of the lock pawl and have the same flat plate shape as each other.

4. The lifter device according to claim 1,
wherein an angle defined by a normal line of a second contact surface of an outer surface of the outer teeth of the lock pawl that comes into contact with the inner teeth of the base gear and a line obtained by connecting a contact point between the second contact surface and a tooth surface of the inner teeth and the shaft center of the shaft portion is smaller than a friction angle defined by the second contact surface and the tooth surface of the inner teeth.

* * * * *